United States Patent [19]

Oakley et al.

[11] 4,429,327
[45] Jan. 31, 1984

[54] COMPATIBLE TELEVISION SYSTEM WITH INCREASED VERTICAL RESOLUTION

[75] Inventors: Charles B. Oakley, Princeton; Robert A. Dischert, Burlington, both of N.J.

[73] Assignee: RCA Corporation, New York, N.Y.

[21] Appl. No.: 288,753

[22] Filed: Jul. 31, 1981

[51] Int. Cl.³ ............................................. H04N 9/00
[52] U.S. Cl. ...................................... 358/12; 358/16; 358/21 R; 358/64
[58] Field of Search ................ 358/12, 16, 21 R, 135, 358/140, 152, 166, 217, 242, 64; 315/394; 355/14, 15, 40

[56] References Cited

U.S. PATENT DOCUMENTS

| | | | |
|---|---|---|---|
| 3,200,195 | 8/1965 | Davies et al. | 358/242 |
| 3,780,215 | 12/1973 | Shibata et al. | 358/37 |
| 4,052,734 | 10/1977 | Jaeger . | |
| 4,090,214 | 5/1978 | Wright | 358/14 |
| 4,134,127 | 1/1979 | Campioni . | |
| 4,216,492 | 8/1980 | Schmalz . | |
| 4,268,861 | 5/1981 | Schreiber et al. | 358/138 |

FOREIGN PATENT DOCUMENTS

| | | |
|---|---|---|
| 80304293.6 | 11/1980 | European Pat. Off. . |
| 1167561 | 10/1969 | United Kingdom . |
| 1263785 | 2/1972 | United Kingdom . |
| 1507386 | 4/1978 | United Kingdom . |
| 2056813 | 3/1981 | United Kingdom . |

OTHER PUBLICATIONS

Oliphant et al., "A Digital Telecine Processing Channel", *SMPTE Journal*, Jul. 1979, vol. 88, No. 7, pp. 474-480.
"Questions on the Orientation of Research in HDTV in the 80's", by Joseph Polonsky as printed in SMPTE Television Technology in the 80's, at pp. 146-150.
"Development Options for Future Television Systems", by Mike Hausdorfer to the SMPTE High-Definition Study Group on May 7, 1981.

*Primary Examiner*—Howard Britton
*Attorney, Agent, or Firm*—E. M. Whitacre; W. H. Meise

[57] ABSTRACT

A television arrangement generates signals from independent pairs of adjacent lines. The signals are separately summed and differenced to produce S and Δ signals. The S signal is representative of the luminance of a scan between the original scans, and the Δ represents vertical resolution. The signals are transmitted to a monitor for generating a high-vertical-resolution picture. Where the display is a color TV receiver, the Δ signal may be buried within the chroma channel by frequency interleaving with the Δ signal occuring only in locations representing high-frequency vertical information. The buried Δ signal is invisible on a conventional receiver. Other independent data may be coupled through the chroma channel by frequency interleaving.

31 Claims, 19 Drawing Figures

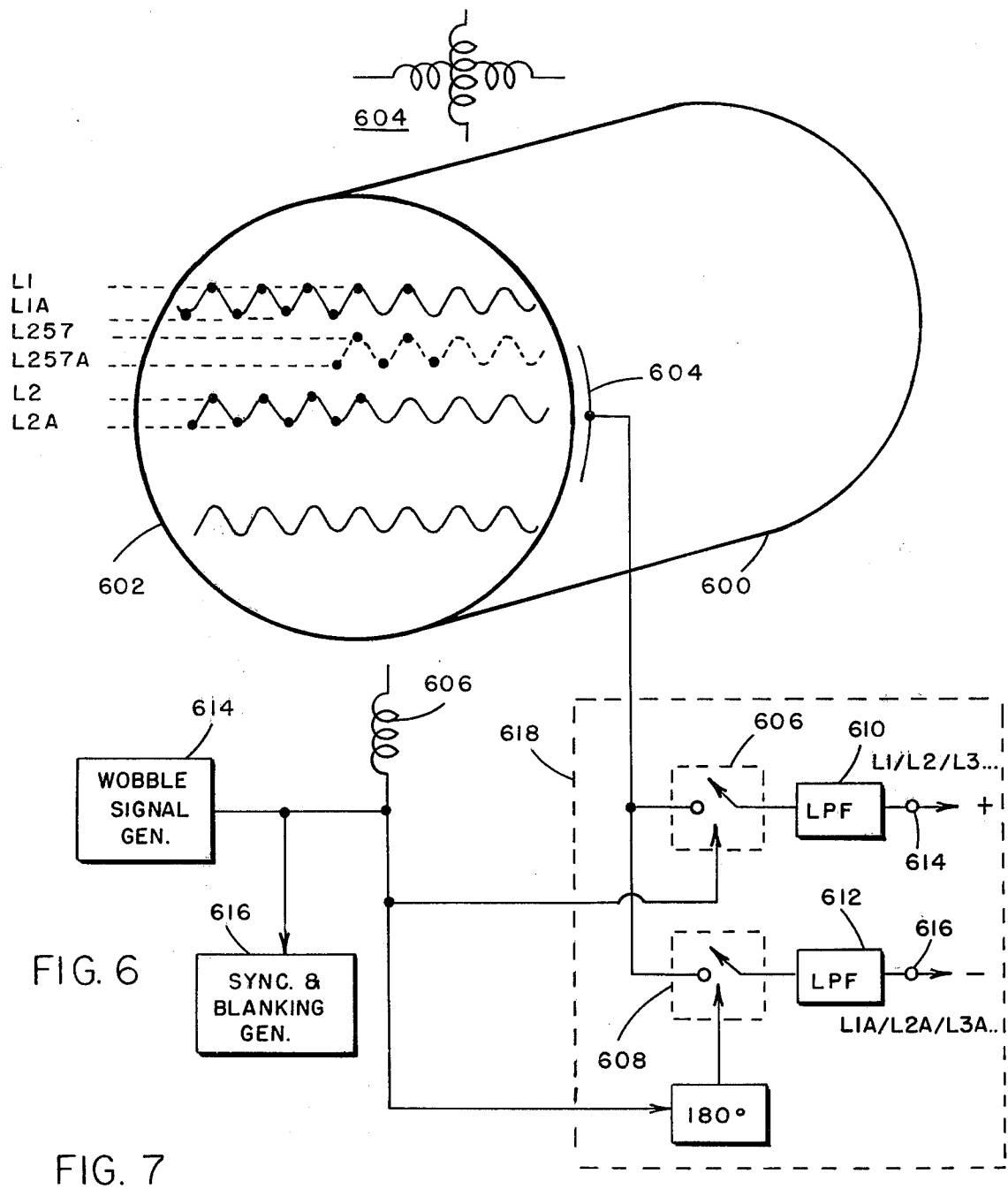
FIG. 6
FIG. 7
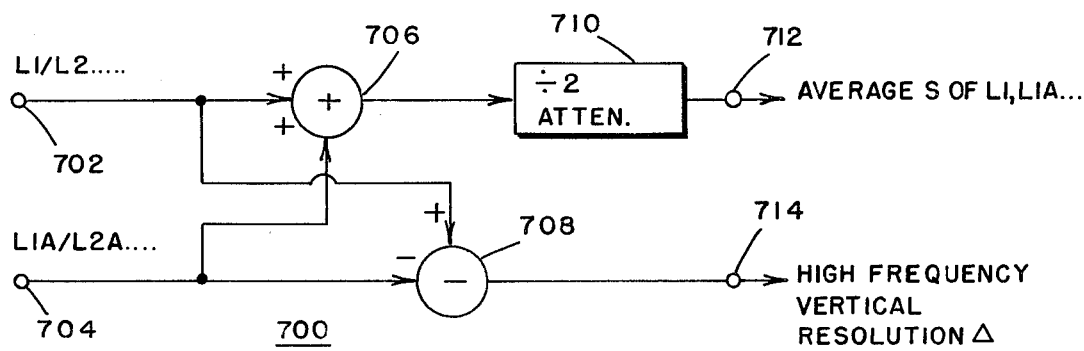

COMPATIBLE TELEVISION SYSTEM WITH INCREASED VERTICAL RESOLUTION

BACKGROUND OF THE INVENTION

This invention relates to a television system which provides increased vertical resolution and which is compatible with standard color television systems such as NTSC. Standard NTSC television scans 525 lines per frame in the form of two sequential fields of 262½ lines. The lines of each field interlace with the lines of the preceding and succeeding fields and the eye integrates these to reduce flicker. However, the line structure is still visible under certain circumstances, and is particularly visible on large-screen television displays viewed from a relatively close distance. The problem is made even more severe by the ultra-large pictures formed by projection-type television displays. The visibility of the line structure is surprising, considering that a composite NTSC signal actually comprises three simultaneous channels of information (one luminance, two chrominance) and therefore represents about 1500 lines per frame. The visibility results from the superposition of the R, G and B signals in triples. It is desirable to increase the effective vertical resolution or definition in a manner compatible with current standard television practice, so that broadcasting of high-resolution signals can begin immediately without seriously degrading the performance of standard television receivers currently in use, and yet be such that when processed by a receiver according to the invention they produce an improved high-resolution picture.

SUMMARY OF THE INVENTION

A high-resolution television communication system includes a video source for generating luminance-representative signals from line scans and a difference-signal generator coupled to the video signal source for generating a difference signal representative of the different between first and second scanned lines. A display is responsive to the luminance-representative signals and to the difference signals for generating first and second lines of raster scan, with at least one of the first and second lines of the raster scan being generated from the vectorial sum of the luminance-representative video signal and the difference signal. In a particular embodiment of the invention, the difference signal is multiplexed into the chrominance portion of a composite color television signal.

DESCRIPTION OF THE DRAWING

FIG. 6 illustrates another embodiment of a camera arrangement which uses fewer tubes than the arrangement of FIG. 4;

FIG. 7 is a block diagram of a circuit which may be used to process signals generated by cameras according to the invention;

DESCRIPTION OF THE INVENTION

Figure 1:
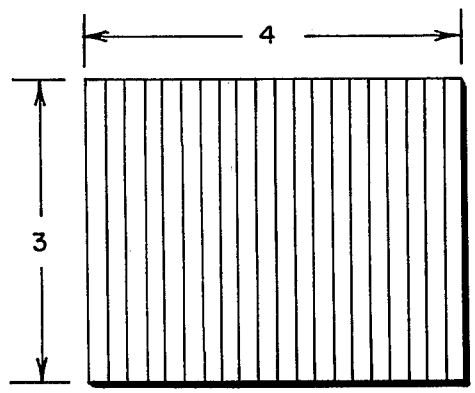
FIGS. 1 and 2 illustrate vertical and horizontal lines on a raster, respectively.

FIG. 1 illustrates a raster having an aspect ratio with a height of three units and a width of four units. The raster is scanned in the usual fashion by successive horizontal lines (not shown). Alternate light and dark vertical lines are displayed on the raster. The light and dark lines are related to the frequency of the signal being processed. The horizontal scanning time in NTSC is 63.5 microseconds of which approximately 10 microseconds is used for horizontal blanking, leaving approximately 53 microseconds as the duration of the active line scan. The alternate light and dark lines formed on the raster in FIG. 1 require positive- and negative-going signal excursions, the rate which is determined by the relative physical spacing of the lines. The luminance bandwidth of the television signal is effectively about 3 MHz as practiced in receivers, and thus the highest-frequency signal which can pass through the band can go through a full cycle (one positive and one negative excursion of the luminance) in $\frac{1}{3}$ $\mu$S. In 53 microseconds (the duration of the active portion of one horizontal line) approximately 160 complete cycles can take place. Thus, 160 black and 160 white lines can occur in one horizontal line, for a total of 320 television lines in a complete horizontal scan. However, in accordance with standard television practice, the horizontal resolution must be multiplied by $\frac{3}{4}$ in order to determine the standard resolution (the resolution which would occur if the raster were square and had a width equal to the height). Thus, the horizontal resolution is about 240 television lines for a 3 MHz bandwidth, or approximately 80 television lines per megacycle. Using this criterion, the resolution in the horizontal direction for a color signal component having a 1.5 MHz bandwidth is about 120 television lines.

Figure 2:

In the vertical direction, each field consists of more than 250 scanned lines as suggested in FIG. 2. The color resolution in the vertical direction is much better than in the horizontal direction, because the horizontal resolution is limited by the chroma channel bandwidth as mentioned above to about 120 television lines, whereas the vertical color resolution is not determined by the channel bandwidth but rather by the number of horizontal lines by which the picture is sampled in the vertical direction. Consequently, the color resolution in the vertical direction much exceeds the color resolution in the horizontal direction, yet the horizontal color resolution is adequate. On the other hand, as mentioned previously the vertical luminance resolution is not adequate since a line structure can be seen in large picture displays.

Figure 3:
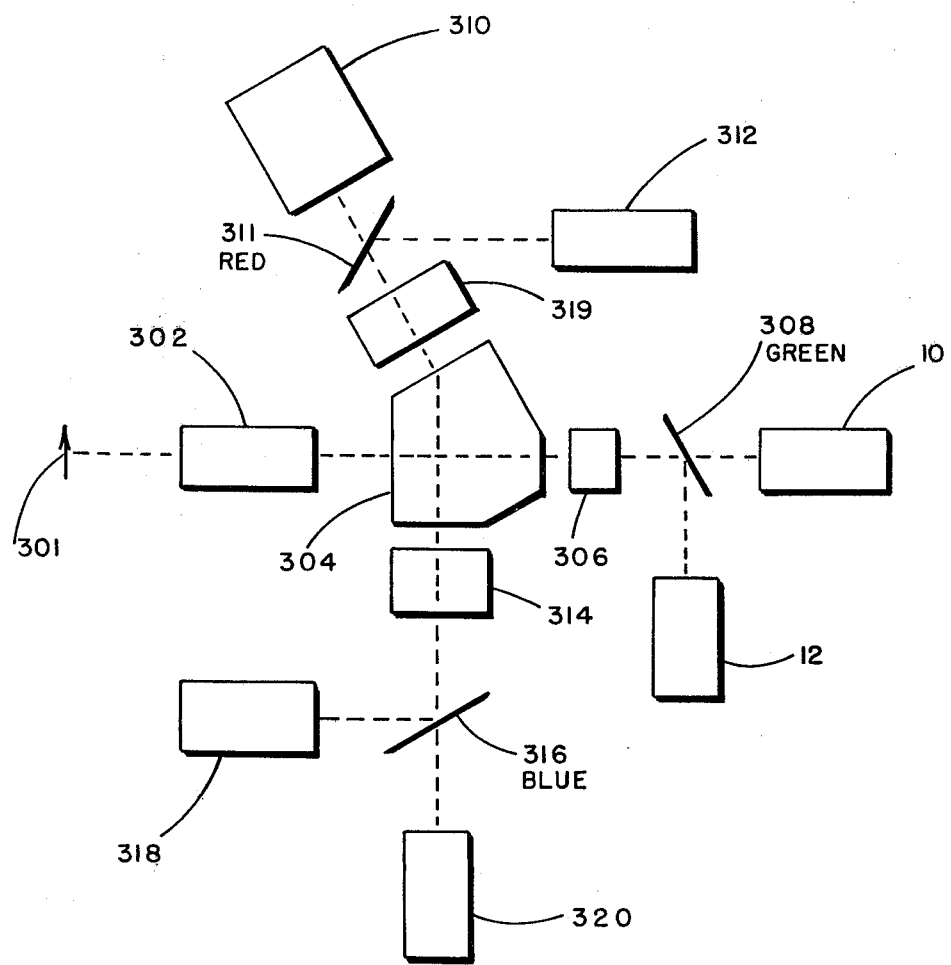
FIG. 3 illustrates the optical portions of a color camera according to an embodiment of the invention.
Figure 4:
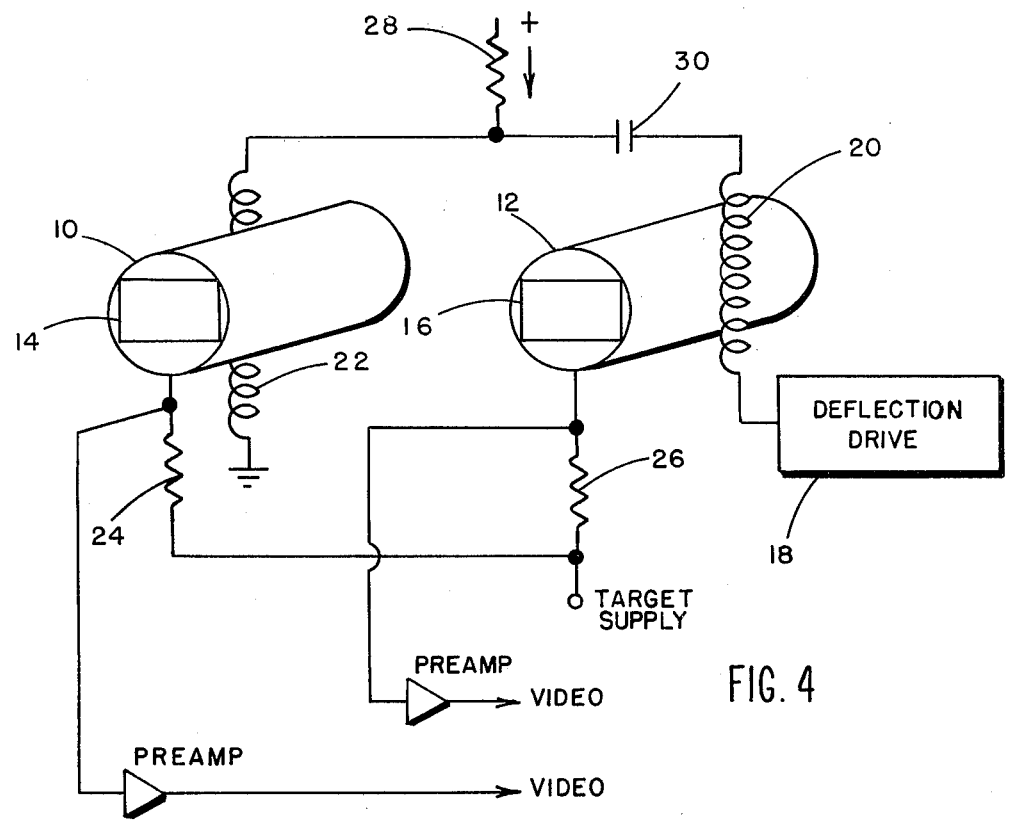
FIG. 4 illustrates camera vidicon and circuit arrangements according to the invention usable in the FIG. 3 camera.
Figure 5:
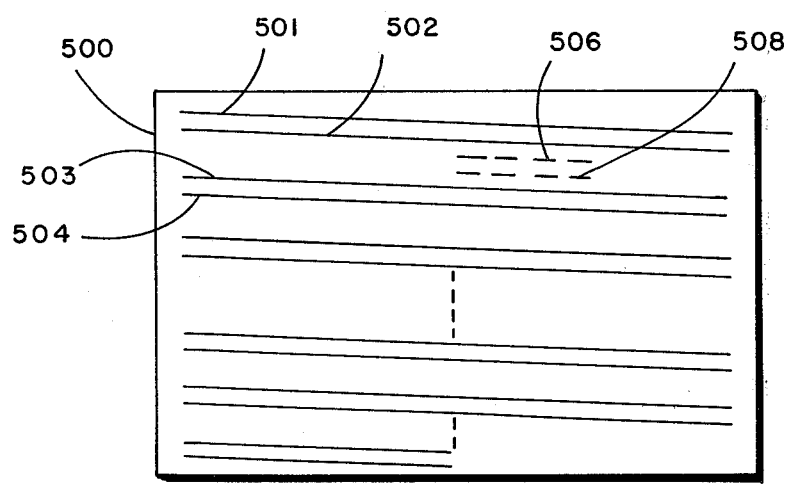
FIG. 5 illustrates paired raster lines useful in understanding the invention.

FIG. 3 illustrates one embodiment of a high-resolution camera in accordance with the invention. In FIG. 3, light from a scene illustrated as an arrow 301 passes through optics illustrated as a block 302 and into a color-splitting prism 304. Green light as is known passes straight through the prism and through further optics 306 as required for focusing an image reflected by a half-silvered mirror 308 onto the faceplate of a camera tube or vidicon 12 and directly through mirror 308 onto the faceplate of a vidicon 10. The red components of the light from the scene are separated by prism 304 and are focused by optics 319 onto the faceplate of vidicon 310 through half-silvered mirror 311 and by way of reflection from the front surface of mirror 311 onto the faceplate of vidicon 312. The blue light is similarly separated by prism 304, focused by optics 314, and half-silvered mirror 316 reflects an image onto the faceplate of camera tube 318 and passes an image to the faceplate of camera tube 320. FIG. 4 illustrates in more detail the circuitry associated with the vidicon 10 and 12, which are representative of any of the pairs. In FIG. 4, two matched vidicons or camera tubes 10 and 12 scan rasters 14 and 16 on the photosensitive faces thereof under the influence of a deflection drive circuit 18 which causes an alternating current through deflection windings illustrated as coils 20 and 22. Identical images are formed on rasters 14, 16 by optical means such as described in conjunction with FIG. 3 which may include a half-silvered mirror. A target supply voltage is applied through resistors 24 and 26 to the targets of tubes 10 and 12, respectively. The signal from each target is coupled to a preamplifier. As described, identical video signals would be derived from each camera tube. As shown in FIG. 4, a small fixed current is caused to flow in a resistor 28 which is blocked from winding 20 by a capacitor 30, forcing the direct current to flow through winding 22. This small additional current is selected so as to offset the scanning lines of raster 14 slightly compared with the raster lines scanned by tube 12 on raster 16. The amount of current is selected to offset raster 14 vertically by ¼ of the distance between adjacent scan lines. FIG. 5 shows the positions of the scan lines generated by tube 10 and 12 relative to the image being scanned. The image being scanned for purposes of this explanation may be considered to be the single rectangle 500, although the image actually occurs on two faceplates and may not rectangular. Scan line 501 is produced by tube 10 simultaneously with scan line 502 produced by tube 12. Since the scan lines are in slightly different positions relative to the image, the video produced during scanning of adjacent lines 501 and 502 may be different although due to the physical proximity of the lines on the image the video will often be the same. Tube 10 then scans line 503 simultaneously with the scanning by tube 12 of line 504. The separation between lines 502 and 503 is selected so that on the next field following the one shown, tube 10 can scan a raster line in the position shown by dotted line 506 and tube 12 can scan a raster line in the position shown by dotted line 408, thus providing interleaved scanning or interlace over a frame (two-field) interval. Tubes 10 and 12 continue scanning across the identical images on their photosensitive screens with lines that are slightly offset until each produces 262½ lines, whereupon the field ends and the next field begins. In all, 525 lines are scanned per field and 1050 lines are scanned per frame for the apparatus of FIG. 4, while that of FIG. 3 scans 1575 lines per field and 3150 lines per frame.

Resistor 28 and capacitor 30 illustrated in FIG. 3 may be deleted from the circuit, provided that the images formed on the transparent faceplates of the vidicons are offset physically by a small amount so that identical raster scans can produce video from slightly different portions of the image offset by the amount described.

FIG. 6 illustrates another embodiment of an arrangement for producing two simultaneous video signals representative of slightly different portions of a monochromatic image. The arrangement of FIG. 6 may be used three times in conjunction with a color splitting prism to form simultaneous R, G and B signals. In FIG. 6, a vidicon 600 has a faceplate 602 onto which an image is focused by optics, not shown. Vertical and horizontal deflection windings designated generally as 604 and driven by suitable deflection circuits cause the electron beam of the vidicon to scan a raster at a high horizontal rate such as 15,750 Hz and to scan vertically at a slower rate such as 60 Hz. An auxiliary deflection winding 606 is coupled to a wobble clock generator 614 and is oriented to produce vertical deflection of the electron beam. Wobble generator 608 produces a signal at a rate which is high (substantially higher than the highest video frequency) relative to the horizontal deflection rate and of sufficient amplitude to cause a peak-to-peak vertical deflection equal to ¼ of the separation between lines. As described in conjunction with FIG. 5, this allows for interlaced scanning with the lines of the preceding and succeeding fields. The vertical deflection caused by the auxiliary windings is illustrated by dotted line 257, 257a on the face of kinescope 600. Thus, each scanline traces a sinuous path across the raster. The upper excursions of each path are labeled with the line number (e.g. L1, L2 . . . ) and the lower extremity of each path is labeled with the line number and the suffix "A". Video signal is continuously produced at target contact 604 during scan and is coupled to synchronous detectors 606 and 608.

Synchronous detectors 606 and 608 can be represented as controllable mechanical switches 606 and 608 controlled by the clock signal generator. The wobble clock signal applied to detector 608 is phase inverted so that switches 606 and 608 close alternately. Switch 606 closes during the upward excursion of the sinuously deflected scan path, and switch 608 closes during the downward excursions of the sinuous path. The video signal received at target 604 during the upward excursions appears at the output of switch 606, and the video signal occurring during the downward excursions appears at the output of switch 608. The switching signal is filtered by low-pass filters 610 and 612 to produce filtered signals L1, L2, L3 ... at output terminal 614 and L1a, L2a, L3a ... at output terminal 616. Thus, simultaneous lines of information are available representing scans of the image displaced by ½ of the interline separation. These simultaneous lines L1, L1A; L2, L2A ... correspond to lines 501, 502; 503, 504 ... illustrated in FIG. 5 and the filtered video at output terminals 614, 616 is essentially indistinguishable from that produced in the arrangement of FIG. 4.

Figure 8:
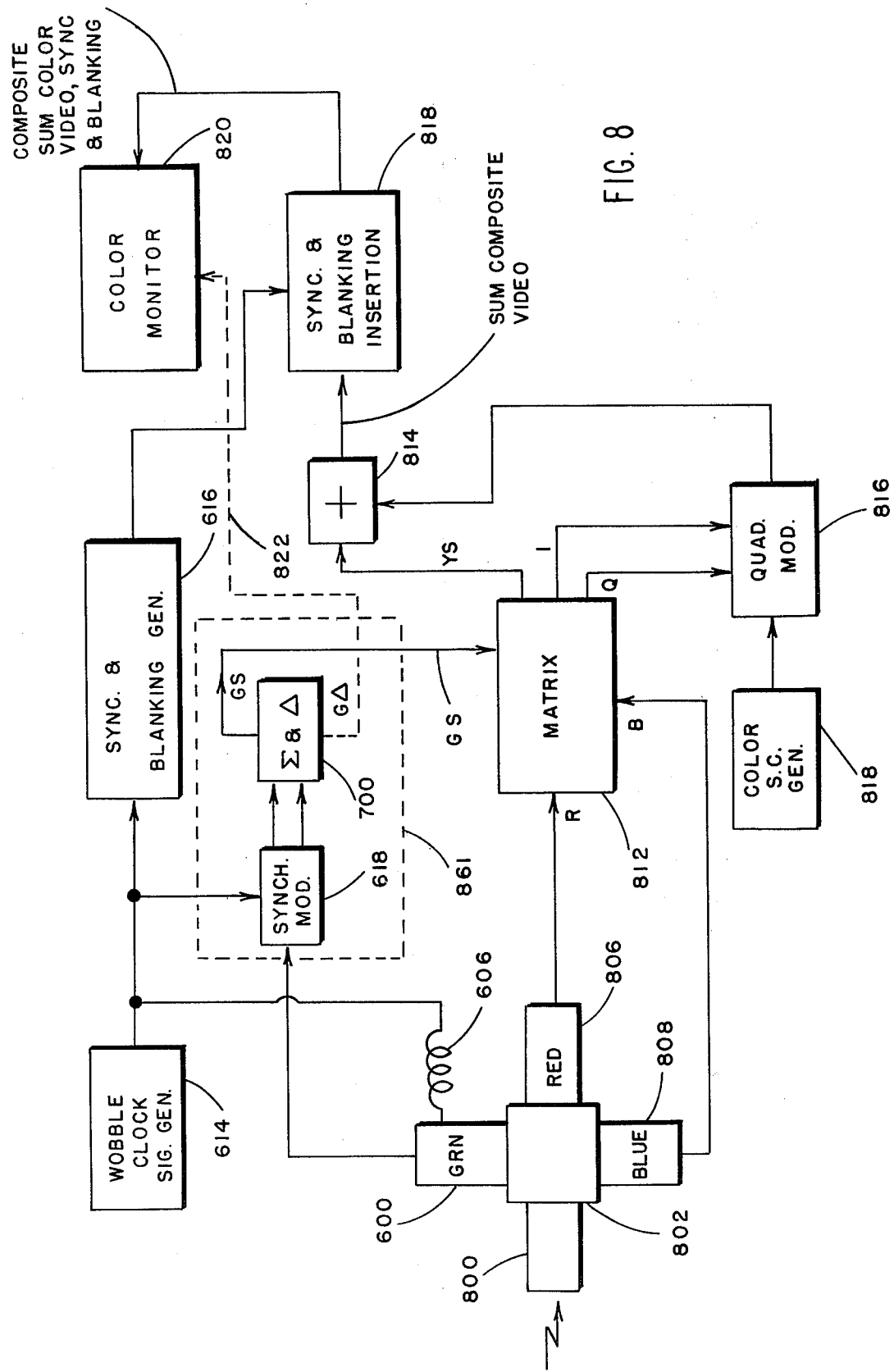
FIG. 8 is a complete system according to the invention using a conventional TV monitor for display of high-resolution signals carried on wires.

FIG. 7 illustrates circuitry for producing from the video from simultaneously occurring horizontal scan lines separated by a small vertical distance, however they may be generated, a signal representative of the sum (s) or average of two adjacent scan lines and another signal (Δ) representative of the difference. In FIG. 7, input terminal 702 is adapted to be coupled for example to terminal 614 of the arrangement of FIG. 6 for receiving video from one scan line, while terminal 704 is adapted to be coupled to terminal 616 for receiving video from a proximate scan line. Terminal 702 is coupled to the non-inverting inputs of an adder 706 and a subtractor or differencing circuit 708. Terminal 704 is coupled to another non-inverting input of adder 706 and to an inverting input of subtractor 708. The output of adder 706 is a signal having approximately twice the amplitude of either input signal, and therefore a divide-by-two attenuator 710 is coupled to the output to normalize the output signal of adder 706 to produce at output terminal 712 of the attenuator an averaged signal (S) substantially equivalent to the signal which would have been produced by a single scan line physically located between lines L1, L1A; L2, L2A .... Subtractor 708 subtracts the values of the two signals to produce at terminal 714 a difference signal (Δ) representative only of the high-frequency vertical resolution. For example, if lines L1 and L1A are identical, subtractor 708 produces no output signal. This indicates that there is no change in the signal between lines L1 and L1A and therefore indicates that the available vertical resolution is not being used. Similarly, the existence of difference signal Δ at the output of subtractor 708 indicates that the resolution is being used by a vertical transition occurring somewhere between the line pairs. The average signal S thus produced is totally equivalent to the signal produced by a conventional monochrome camera viewing the same scene. The arrangement of FIGS. 6 and 7 together differs from the arrangement of a vertical aperture corrector in that the sum and difference signals are derived from independent pairs of lines (i.e., L1, L1A, L2, L2A ... ) whereas in aperture correctors the lines are processed in sequential pairs including a previously processed line (L1, L1A; L1A, L2, L2; L2A ... ). FIG. 8 depicts a color television system in which a conventional 525 lines-per-frame display unit receives signals generated by the arrangement of FIG. 6. In FIG. 8, light from an object (not shown) passes through optics 800 at the left of the FIGURE and is split into red, green and blue components by a color splitting prism 802. The red and blue components fall upon the faceplates of conventional single vidicons 806 and 808, respectively, which in turn produce 525 line-per-frame red and blue signals. The green light from prism 802 falls upon the faceplate of a vidicon 600. Vidicon 600 is operated in a manner described in conjunction with FIG. 6, with an auxiliary deflection winding 606 driven by a clock signal generator 614 to produce video which is applied to a synchronous demodulator and processor 618 of signal processor 861 for demodulation into L1, L2, L3 ... on one output conductor and into L1A, L2A, L3A ... on anther output conductor. The demodulated output signals are coupled to a summing and differencing circuit 700 of processor 861 for generation of green sum (GS) and green difference (GΔ) signals. The green sum signal GS and the red and blue signals are applied to a matrix 812. As mentioned, the sum green signal is equivalent to the green signal produced by a conventionally operated vidicon, and therefore matrix 812 produces a luminance sum signal (YS) which is applied to an input terminal of an adder 814, and also produces I and Q chrominance signals which are applied as is known to a quadrature modulator 816 for amplitude modulation of the chrominance signals in a quadrature manner onto a color subcarrier signal applied from a generator 818. Demodulated chrominance information is applied to a second input of adder 814 to form a sum composite video signal (YS+C).

The clock signals from generator 614 are applied to a sync and blanking signal generator 616 which produces standard sync and blanking signals which are applied to a block 818 for controlling the time of insertion of the appropriate sync and blanking voltages into the sum composite video signal. At the output of block 818, a complete composite color television signal is available which may be applied to a conventional color monitor 820 for use in the usual manner. It should be noted that the Δ(delta) signal produced by processor 618 was not necessary for this normal operation. Thus, even if the Δ signal were coupled to color monitor 820 as by a conductor illustrated as dotted line 822, monitor 820 having no means for processing the additional information would simply ignore it and produce a standard-resolution signal in the usual manner.

In accordance with one aspect of the invention, a color monitor operated in a system such as that illustrated in FIG. 8 may be modified to utilize the difference signal GΔ to produce a high-resolution signal.

Figure 9:
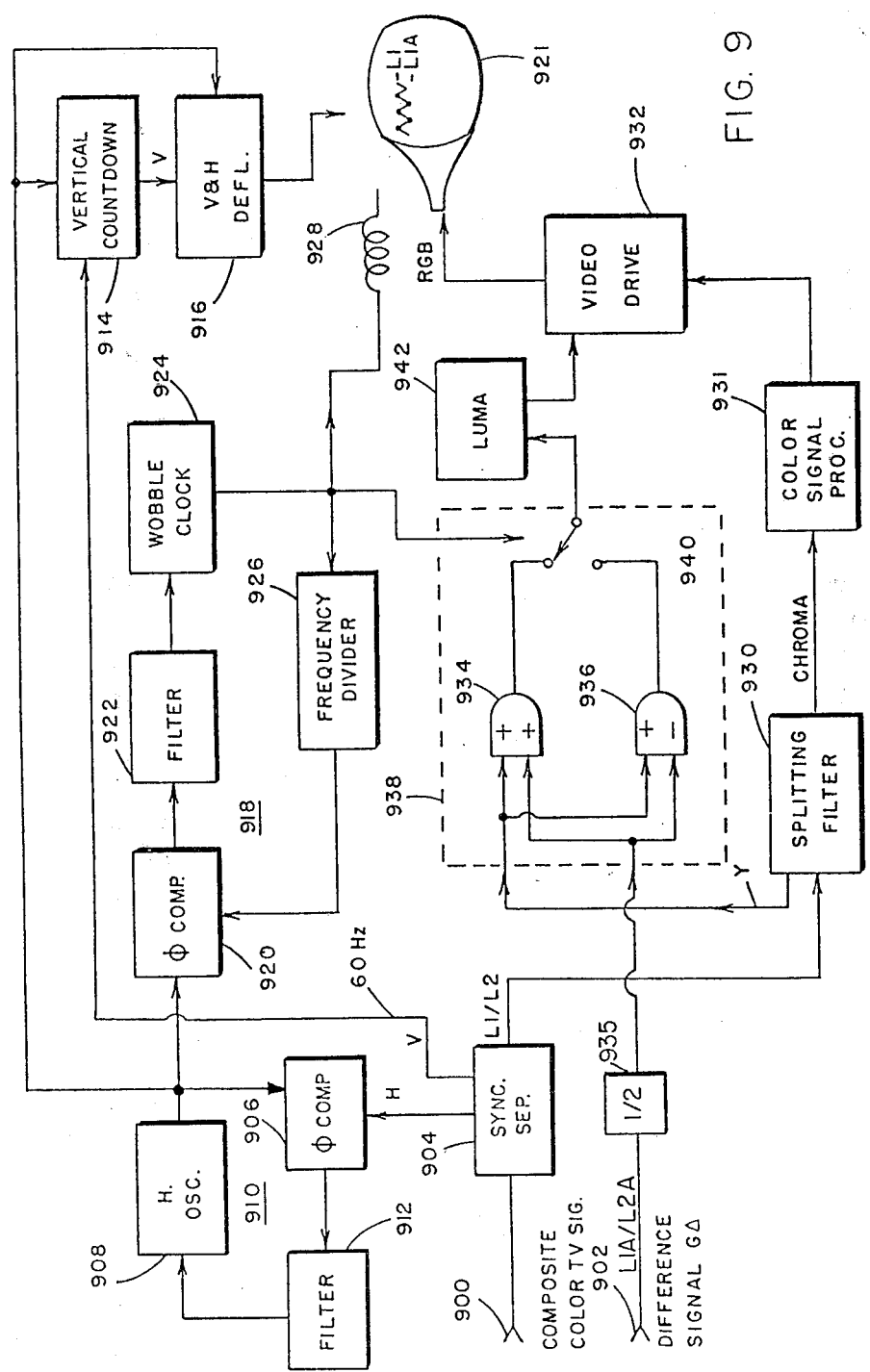
FIG. 9 illustrates a TV monitor according to the invention adapted for producing improved pictures in the arrangement of FIG. 8.

In FIG. 9, a monitor receives composite color television signals at an input terminal 900 and difference signals GΔ derived from the green-representative video at an input terminal 902. The composite signal is applied to a sync separator 904 which produces vertical and horizontal sync signals. The horizontal sync signals are applied to a phase comparator 906 together with horizontal oscillator signals from a horizontal oscillator 908 of a phase-locked loop (PLL) 910 including a loop filter 912. PLL 910 locks the horizontal-rate signals of oscillator 908 to the horizontal sync signals extracted from the composite video. A vertical-rate signal is produced by a vertical deflection portion of deflection block 916 which for this purpose may receive vertical signals from a vertical count-down circuit 914 driven by horizontal-rate signals from oscillator 908 (60 Hz in this particular embodiment) which may be locked to the horizontal rate. The separated vertical sync signal is applied to count-down 914 to lock the phase of the vertical-rate signal applied to deflection circuit 916. Vertical and horizontal deflection circuit 916 is coupled in known fashion by a deflection yoke (not shown) to a kinescope 921.

A wobble clock generator 924 is coupled in a PLL 918 including a phase comparator 920 coupled to horizontal oscillator 908 and producing control signals filtered by loop filter 922. PLL 918 also includes a frequency divider 926 for dividing the wobble clock frequency into the range of the horizontal oscillator frequency so that the wobble clock frequency is locked to a multiple of the horizontal oscillator frequency. The wobble clock signal is applied to an auxiliary deflection winding 928 coupled to kinescope 921 to provide a small amount of vertical deflection in a manner similar to that described in conjunction with FIG. 6. The wobble clock signal is also applied to synchronous demodulator 938 to control the operation of synchronous switch 940. It should be noted that wobble clock 924 need not be locked to the horizontal oscillator frequency and need bear no special relationship to the original wobble clock signal. So long as the phasing of the synchronous demodulator and the polarity of the scanned deviation caused by the monitor wobble clock are properly established when the monitor is manufactured, no further synchronization is required. However, in order to reduce the visibility of beats which may occur between low-level distortions introduced by the synchronous modulators and demodulators, it may be advantageous to lock the wobble clock at the receiver to the wobble clock at the transmitter by relating the receiver wobble frequency to the horizontal oscillator frequency as illustrated in FIG. 9, and also similarly locking the source wobble clock or possibly by locking to other system rates such as the color subcarrier rate.

The composite color television signal from which the sync has been removed is applied to a luma-chroma splitting filter 930 of known type which separates the luminance information from the chrominance information. The chrominance information is applied by conventional color signal processing circuit 931 to an input of a video drive circuit 932, the output of which is coupled to the control electrodes of kinescope 921. The luminance information is coupled to the non-inverting inputs of a summer 934 and a subtractor circuit 936 of a synchronous demodulator 938. The difference signals $G\Delta$ generated at the output of modulator 618 of FIG. 8 is applied by way of terminal 902 and divide-by-2 attenuator 935 to the non-inverting input terminal of summing circuit 934 and to the inverting input terminal of differencing circuit 936. The output of summing circuit 934 is the sum of two video signals and is 2L1/2L2 . . . . The $G\Delta$ signal has twice the desired amplitude, and is therefore reduced by passing through an attenuator 935. The reconstituted Green L1/L2 . . . signal is applied to a terminal of single pole, double throw switch 940 controlled at the wobble clock rate. The L1A/L2A signal is produced by differencing circuit 936 and is applied to the other terminal of switch 940. The signal at the output of switch 940 is a recreation of the YS signal derived from the R, GS, B signal originally scanned by vidicons 806, 808 and by vidicon 600 in its sinuous manner. Since the luminance signal is composed principally of green rather than red or blue, the $G\Delta$ signal by which the YS is modified is very close to the more theoretically correct YS signal. This reconstituted YS signal is applied to further luminance processing illustrated as a block 942 and is then applied to the second input of video drive circuit 932 for matrixing with the chrominance signal from filter 930 to produce the signal for display on kinescope 921.

In operation, the high-resolution monitor of the arrangement of FIG. 9 reconstitutes the high-resolution signal from the composite color television signal derived from a YS signal together with the $\Delta$ signal produced on a separate channel to generate a signal having 525 lines per field and 1050 lines per frame.

As so far described, the high-resolution system requires four independent input channels; the luminance, sync and blanking signals at baseband constitute a first channel; the I signal frequency-interleaved with the luminance is a second channel; the Q signal also interleaved with luminance but in phase quadrature with the I signal constitutes a third channel; and the difference signal on a separate conductor is the fourth channel. While such an arrangement may be perfectly satisfactory in a studio, the extra conductor for carrying the difference signal is not suitable for ordinary broadcast use as for broadcast service to multitudes of standard NTSC broadcast receivers. According to yet another aspect of the invention, the difference signal is inserted into or hidden within (multiplexed into) a portion of the chrominance signal. It is ordinarily true that a color transition is accompanied by a luminance transition. Subjectively, the luminance component of the transition is more important than the chrominance component. Consequently, some chrominance errors are acceptable in regions of rapid luminance changes. Advantage is taken of this subjective effect to form a fourth channel within a standard three-channel composite television signal such as an NTSC or PAL signal through which the luminance difference signal can be transmitted in a compatible manner.

Figure 10:
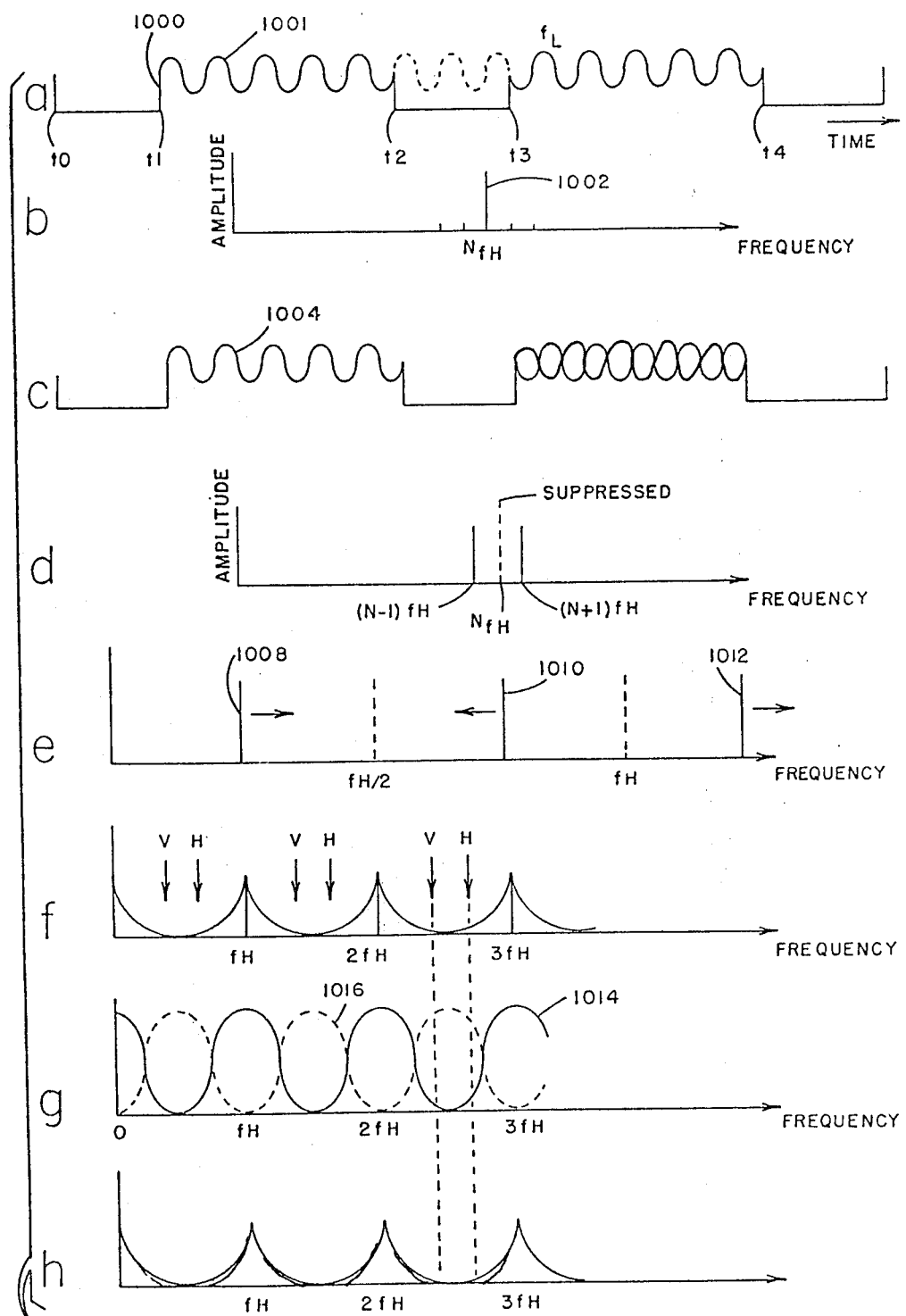
FIG. 10 illustrates time waveforms and frequency spectra useful in understanding certain aspects of signal burying.

FIG. 10a illustrates a time-domain baseband luminance signal 1000 representing recurrent lines of information having horizontal blanking intervals T0–T1, T2–T3. Instead of luminance, signal 1000 may be a baseband color difference signal. During the active line interval, a sinusoidal signal 1001 occurs which is in-phase from line to line. The signal illustrated has five complete sinusoidal cycles during the active portion of the line and would result in a raster display of five vertical black lines interleaved with five vertical white lines (five vertical patterns of alternating or different color in the case of color difference signals). The frequency NfH of such a sinewave would be approximately 2 MHz. FIG. 10b illustrates the spectral composition of the video signal 1000. As illustrated, the spectrum includes a single major spectral line 1002 at frequency NfH together with minor side lobes (N−1)fH and (N+1)fH at 15 KHz intervals from fH. FIG. 10c illustrates a video waveform 1004 similar to signal 1000 in which the sinewave is out-of-phase from line to line. This is in effect a suppressed-carrier signal, in which the carrier at frequency NFH is suppressed as illustrated by the dotted line in FIG. 10d, and the spectral energy appears in the form of the 15 KHz sidebands. When a camera views a vertical pattern such as a picket fence and a zoom lens is used to change the number of cycles in the pattern being viewed, the number of pickets in the pattern changes continuously from one whole number to another, but the spectral energy does not change frequency smoothly with changes in the number of cycles in the recurrent pattern. Rather, as a result of the recurrent sampling at the horizontal rate, energy appears only at multiples of the horizontal frequency, with one spectral line decreasing in energy while another increases as the number of cycles in the recurrent pattern is changed. FIG. 10e illustrates a spectral line 1008 resulting from a raster pattern which in the vertical direction consists of alternate light and dark horizontal lines. As the number of lines in the raster increases, spectral line 1008 moves to the right, to a position representative of a higher frequency. Because of the horizontal-rate sampling of the raster, spectral line 1008 also appears as sidebands of horizontal-rate carriers. Thus, spectral lines 1010 and 1012 are the lower and upper sidebands, respectively, of FH which correspond to spectral line 1008. As can be seen, the high-definition (high-frequency) vertical-direction signal is concentrated around multiples of half the line rate; that is, interspersed between multiples of the line rate as illustrated by the regions VH illustrated in FIG. 10*f*. Ordinary pictures do not consist only of single vertical or horizontal patterns. Rather, they contain signals at many frequencies resulting from vertical and horizontal characteristics of the scene being viewed. FIG. 10*f* also shows the usual spectral energy pattern in an average picture.

As mentioned, the vertical color resolution in a standard NTSC picture exceeds the horizontal color resolution. Consequently, in the vertical direction there is excess color resolution which is not necessary for display of an acceptable picture. In accordance with the invention, the excess vertical resolution is removed from a color signal and the region thus cleared in the spectrum is used for a fourth channel through which the high-definition luminance-related signal may be transmitted. The excess vertical color resolution is removed by removing signal from the region VH illustrated in FIG. 10*f*.

Figure 11:
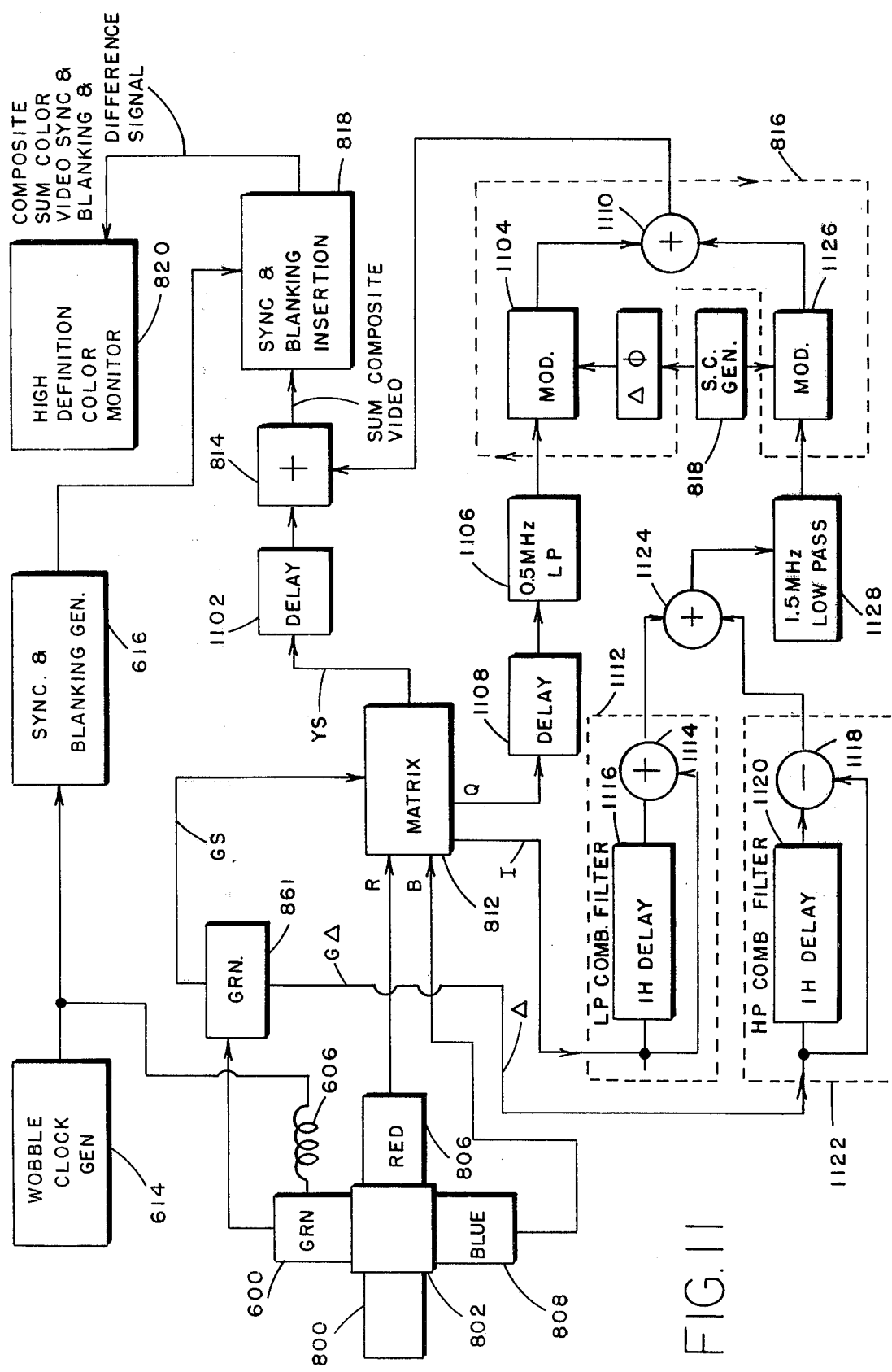
FIG. 11 is a block diagram of a color television system according to the invention in which the high resolution signals are buried in the composite color signal.

FIG. 11 illustrates in block diagram form an arrangement according to the invention for creating a fourth channel within an NTSC signal processing channel through which independent information can be transmitted. In the particular embodiment shown, the additional information is the high-definition luminance-related difference signal G$\Delta$ derived from successive green lines. The arrangement of FIG. 11 is generally similar to the arrangement of FIG. 8, and elements corresponding to those in FIG. 8 are designated by the same reference numeral. The YS signal from matrix 812 in the center of the FIG. 11 is applied to summing circuit 814 through an additional delay circuit 1102 for the purpose of causing the YS signal to arrive at summer 814 at the same time as the modulated chrominance signal. Similarly, the Q signal from matrix 812 is applied to a modulator 1104 of quadrature modulator 816 (lower right of FIGURE) by way of a conventional 0.5 MHz low-pass filter 1106 and a delay circuit 1108. Delay 1108 is selected to cause the modulated Q signal to arrive at a summing circuit 1110 (part of quadrature modulator 816) simultaneously with the modulated I signal.

The I signal produced by matrix 812 in a conventional manner from R, GS and B signals is applied directly to the input terminals of a summing circuit 1114 and to another input of summing circuit 1114 by way of a 1 H delay 1116. Summer 1114 and delay 1116 together constitute a comb filter 1112. The transmission characteristic of filter 1112 is illustrated by solid line 1014 of FIG. 10*g*. It will be noted that response 1014 is a maximum at zero frequency and therefore filter 112 is a low-pass comb filter. Nulls occur in response 1014 at frequencies corresponding to frequency range VH illustrated in FIG. 10*f* within which frequency range the vertical high-resolution signals occur. Consequently, the I signal leaving filter 1112 has a spectral response generally similar to that shown in FIG. 10*h*, which as can be seen is very similar to that in FIG. 10*f* except for attentuation or complete removal of the high-frequency portions. Filter 1116 thus clears out of the I signal a high-resolution portion into which another signal can be inserted.

Difference signal G$\Delta$ is applied directly to an input of a subtractor 1118 and is also applied to a second input of subtractor 1118 by way of a 1 H delay 1120. Together, subtractor 1118 and delay 1120 constitute a high-pass comb filter 1122 having a transmission response characteristic similar to that illustrated by dotted line 1016 of FIG. 10*g*. This response allows G$\Delta$ signals to pass through filter 1122 when within the frequency range of those signals removed from the I signal by filter 1112, and prevents passage therethrough when the G$\Delta$ signals are in the frequency range of the I signals passing through filter 1112.

The low-pass filtered I and high-pass filtered G$\Delta$ signals are applied to the inputs of a summing circuit 1124 so as to frequency interleave the signals. The G$\Delta$ signal only occurs when there is a transition in the G signal from one horizontal line to the next, as mentioned. Vertical color transitions, will very often be accompanied by luminance transitions, and the G signal is the principal constituent of the luminance. Consequently, the G$\Delta$ signal being added to the I signal will most often occur only in the region of a fast vertical color transition. The presence of the G$\Delta$ signal within the I signal may affect the color rendition of a conventional display but the G$\Delta$ signal, being at its maximum value during the fastest color transitions, has the greatest effect only during those times when it is least visible.

The combined I and G$\Delta$ signals are coupled from summing circuit 1124 to a modulator 1126 by way of a conventional 1.5 MHz low-pass filter 1128 such as is commonly used for limiting the I bandwidth. Modulators 1104 and 1126 receive mutually phase-shifted signals from a subcarrier generator 818, onto which each modulator amplitude modulates its input signal and the resulting mutually quadrature-modulated Q and I-interleaved-with-G$\Delta$ signals are summed in summing circuit 1110 from which they are coupled to an adder 814 to be added to the YS signal. Naturally, maximum utility of the resultant composite sum color video television signal including difference signals is achieved only by a display monitor capable of extracting the difference signal $\Delta$ from the I signal.

Figure 12:
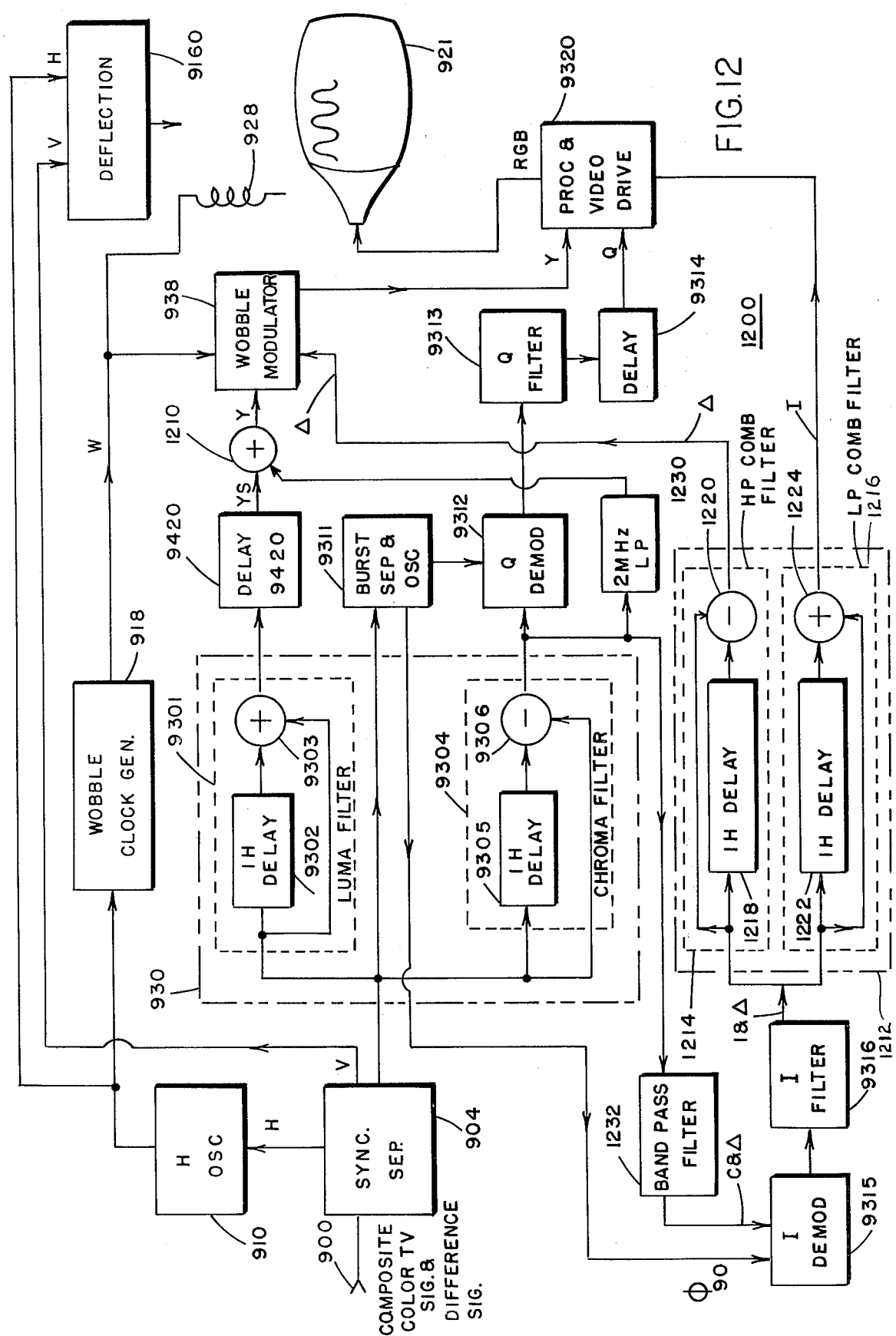
FIG. 12 is a block diagram of a color TV display monitor adapted for display of images from composite color TV signals with buried high-definition components.

FIG. 12 illustrates a portion of a monitor adapted for extracting the $\Delta$ difference signal, however derived, from the I signal. FIG. 12 is generally similar to FIG. 9, and corresponding elements have either the same reference number or a reference number containing as a prefix the reference number of the corresponding element of FIG. 9. In FIG. 12, a composite color television signal including a difference signal buried within the I channel as described in conjunction with FIG. 11 is applied at terminal 900 to a sync separator 904 in which vertical and horizontal sync signals are separated. The spectrum of the composite signal is shown in simplified form in FIG. 13*a* in which the solid lines represent Y and the dotted lines represent modulated chrominance signals with the location of the difference signals shown as $\Delta$. As can be seen, the difference signal in the chroma signal occurs generally near the frequency of the Y signal. The separated horizontal sync signals from separator 904 are applied to horizontal oscillator 910 for generating horizontal sync signals which are applied to a wobble clock generator 918 and which are also applied together with the separated vertical sync signals to a deflection apparatus illustrated as a block 9160.

Wobble generator 918 generates wobble signals which are applied to auxiliary deflection coil 928 associated with kinescope 921 for causing a small vertical deviation of each scan line as described in conjunction with FIG. 6. The wobble signals are also applied to a wobble modulator 938 to control the synchronous switch (not shown in FIG. 12) by which the YS signal is alternated at the wobble rate to produce two lines of video for the high-definition display. Composite video from which the sync has been separated is applied from sync separator 904 to a luma-chroma splitting filter 930 and to a burst separator and oscillator 9311. Burst separator and oscillator 9311 samples the burst signal in known fashion and generates two quadrature subcarrier signals for application to a Q demodulator 9312 and I demodulator 9315.

Figure 13:
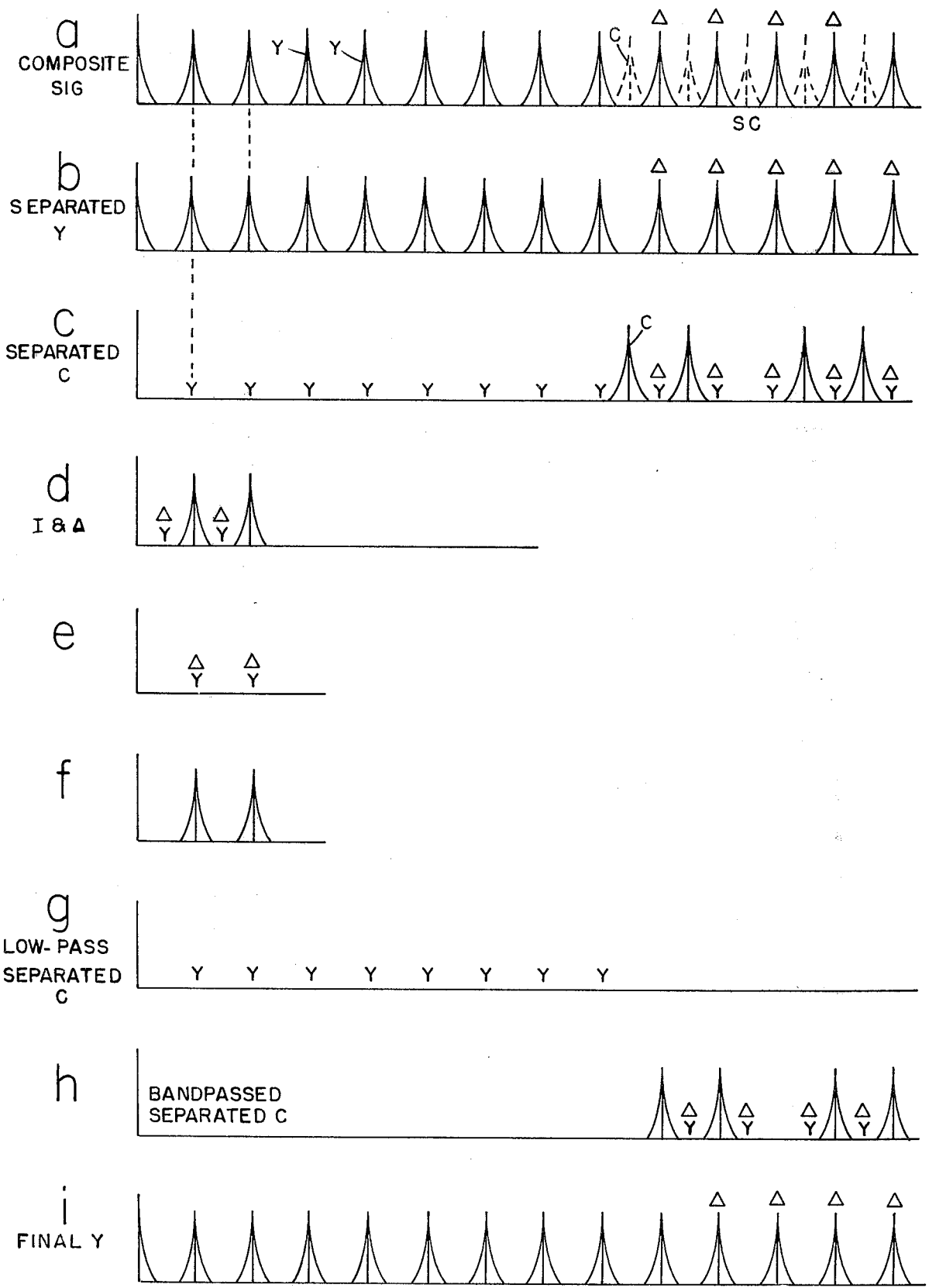
FIG. 13 illustates signal frequency spectra aiding in understanding the arrangement of FIG. 12.

The composite video signal applied to splitting filter 930 is applied therein to a luminance filter 9301 the response of which is complimentary to that of a chrominance filter 9304. Luminance filter 9301 includes a 1 H delay 9302 and a summing circuit 9303 for producing a transmission response similar to 1004 of FIG. 10g, while chroma filter 9304 includes a 1 H delay 9305 and a subtracting circuit 9306 for producing complementary response 1016. The luminance output of filter 9301 illustrated in FIG. 13b is applied to the Y input of wobble modulator 938 by way of a delay circuit 9420 and an adder 1210. The separated Y signal includes residual Δ signal occurring at frequencies near the peaks of the response of filter 9301. Delay circuit 9420 delays the Y signal applied to modulator 938 so that it arrives at the same time as the corresponding Δ signal.

At the output of filter 9304, the chrominance (C) plus difference signal (C+Δ) is in the form of I+Δ and Q signals quadrature-modulated onto a suppressed subcarrier. The separated chroma (FIG. 13c) is contaminated by residual Y signal as shown by the small letters Y at the principal Y frequencies. The separated C+Δ includes Δ signals within the upper frequency portions of the chroma signal sidebands. The C+Δ signal is applied to a second input of Q demodulator 9312 for demodulation, and the resulting baseband Q signal is passed through a low-pass filter 9313 and a delay circuit 9314 to the Q input of a processing and video drive circuit 9320.

The C+Δ signal of FIG. 13c at the output of filter 9304 is also applied (by way of a bandpass filter 1212 for removing residual Y as in FIG. 13h) to an I demodulator 9315 where it is demodulated with reference to the subcarrier signal from burst oscillator 9311. At the output of demodulator 9315 baseband I signal frequency-interleaved with Δ signal is regenerated with some Y signal contamination, as illustrated in FIG. 13d. This signal is passed through a low-pass I filter 9316 for removal of high-frequency components and is applied to an IΔ separating circuit 1212 including a high-pass comb filter 1214 and a low-pass comb filter 1216. High-pass comb filter 1214 includes a 1 H delay circuit 1218 and a subtractor 1220 for separating the Δ signal (FIG. 13e) from the demodulated I+Δ. Low-pass comb filter 1216 includes a 1 H delay circuit 1222 and a summing circuit 1224 for separating the I signal from the demodulated I+Δ signal. The separated I signal is applied to a third input of processing and video drive circuit 9320 and is combined therein with the Y and Q signals to produce RGB drive signals for application to the kinescope.

The Δ signal produced at the output of high-pass comb filter 1214 is applied to a second input of wobble modulator 938 which operates as described in conjunction with FIG. 9 to reproduce the L1, L2 . . . ; L1A, L2A . . . scan signal as described previously.

The separated C+Δ signal at the output of filter 9304 is also applied to a low-pass filter 1230 having a cutoff frequency below the lower sideband of the chroma signal to separate out the residual luminance signal (FIG. 13g) extracted from the composite signal by chroma filter 9304. This residual Y signal is applied to a second input of summing circuit 1210 to be added to the YS signal for increasing the low frequency vertical luminance resolution in known fashion.

Figure 14:
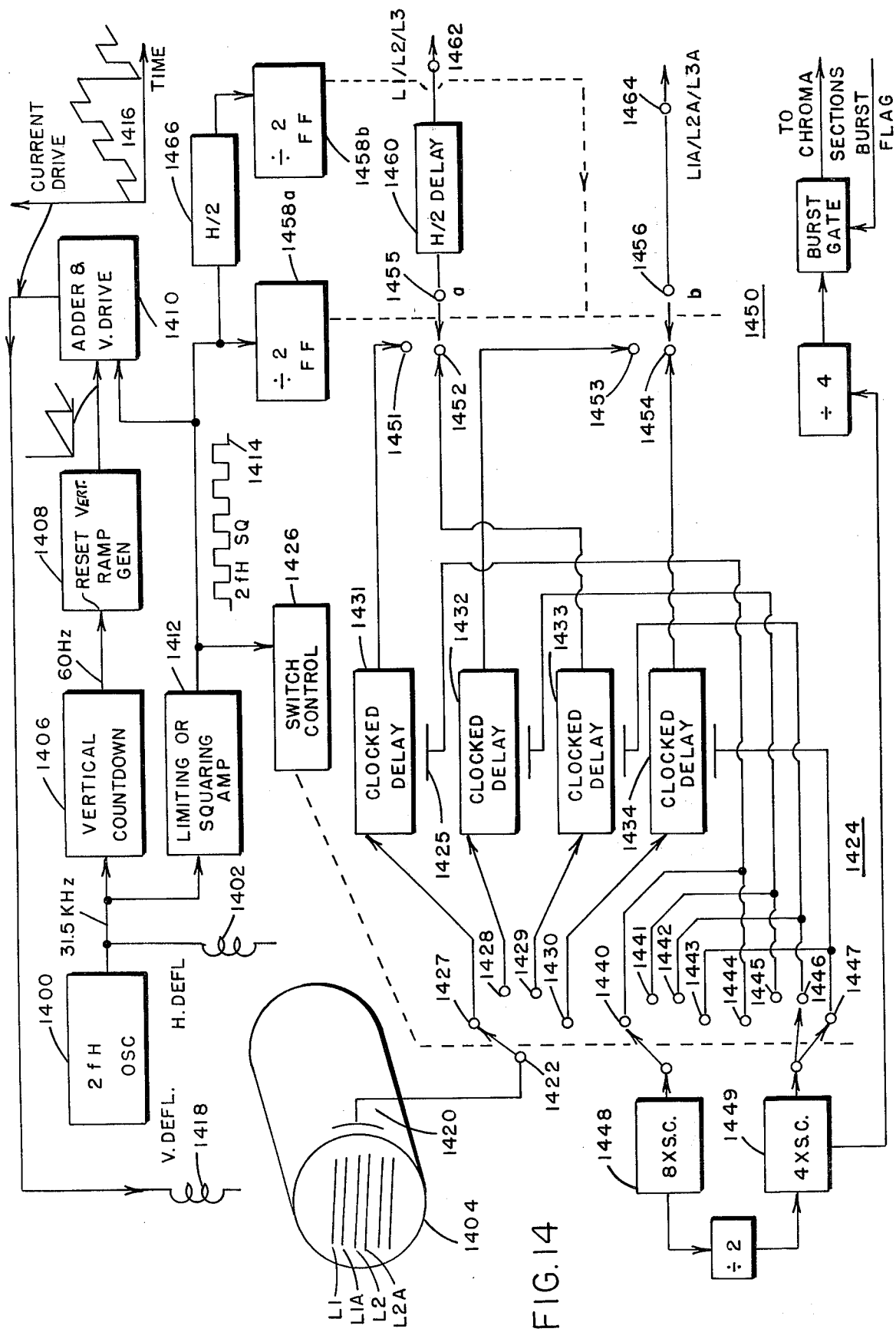
FIG. 14 is a block diagram of another embodiment of a camera arrangement according to the invention in which 2FH scanning is used.

FIG. 14 illustrates another embodiment of an arrangement for generating the simultaneous paired-line information required to generate the S and Δ signals. The arrangement of FIG. 14 is believed to be more amenable to horizontal aperture correction than other embodiments. In FIG. 14, an oscillator 1400 operates at twice normal FH; in the case of signals intended for an NTSC system, oscillator 1400 operates at 31.5 KHz and drives a horizontal deflection winding 1402 associated with a vidicon 1404. Vidicon 1404 thus is scanned at twice the normal horizontal rate. The 2 FH drive signal is also applied to a vertical countdown circuit 1406 which counts the 31.5 KHz down to a 60 Hz vertical rate. The 60 Hz counted signal is used to reset a ramp generator 1408 of known type which uses an integrator to produce a vertical-rate ramp. The vertical-rate ramp is applied to a first input of an adder and vertical drive circuit 1410. The 2 FH signal from oscillator 1400 is also applied to a limiting or squaring amplifier 1412 for producing a 2 FH squarewave which is applied to a second input of adder 1410 for adding to and subtracting from the ramp to produce a signal illustrated as 1416 which is applied to a vertical deflection winding 1418 associated with vidicon 1404. The amplitude of squarewave 1414 added to the ramp is selected to cause line pairing as illustrated on the face of vidicon 1404. Lines L1 and L1A are separated by one-fourth of the distance between lines L1 and L2. This line pairing is similar to that described in the other embodiments.

Target 1420 of vidicon 1404 is coupled to a terminal 1422 of a four-pole, four-throw switch 1424. Switch 1424 is under the control of a switch control circuit 1426 which steps switch 1424 to one of its four positions at the beginning of each new scan line.

Figure 15:
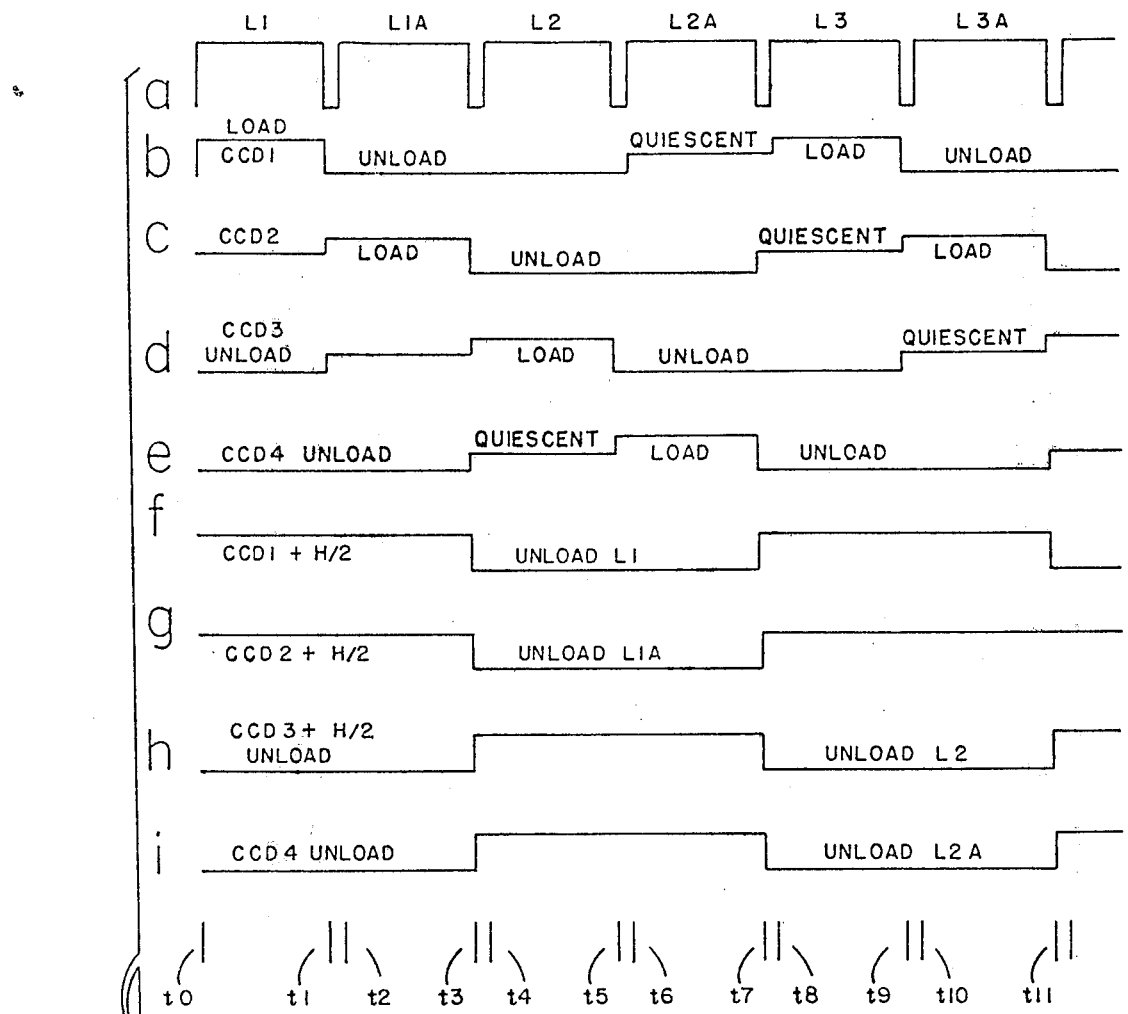
FIG. 15 is a timing diagram aiding understanding of the embodiment of FIG. 14.

In the position shown, the input signal during line L1 is applied from terminal 1422 to a terminal 1427 of switch 1424 and is applied to the input of a delay line 1431. Clock control terminal 1425 of delay 1431 is driven at eight times the subcarrier rate from a clock generator 1448 coupled to switch terminal 1440. Delay line 1432 as is known must have sufficient storage capacity to store the video at the high clock rate for the duration of scan line L1. FIG. 15 is a timing diagram illustrating the operation of switch 1424 and clocked delay lines 1431–1434. Also in the interval T0–T1, delay lines 1433 and 1434 are being clocked at half the high clock rate, in this case four times the subcarrier rate and the output signals are applied by way of terminals 1452 and 1454 of a controlled switch 1450 to terminals 1455 and 1466 of the switch. At time T1, line one ends and at time T2 line scanning of line L1A begins. In the interval T1–T2, switch 1424 is operated and each contact moves clockwise by one throw. Terminal 1422 threfore contacts terminal 1428, and video can be written into delay line 1432 which then is clocked at the high clock rate by way of terminal 1441 from clock generator 1448. Clocking of delay line 1433 ceases, but clocking at the low rate of delay line 1434 continues by way of terminal 1447 from clock generator 1449. Low-rate clocking of delay 1431 begins at the low rate by way of terminal 1444 from clock generator 1449. Also in the interval T1-T2, switch 1450A is thrown to connect delay 1431 to terminal 1455.

In the interval T2-T3, vidicon 1404 scans line L1A and the signal is applied to clocked delay 1432 for being stored therein at the high clock rate. Also in the interval T2-T3, delay 1431 is read out at the low clock rate as illustrated in FIG. 15b and delay 1434 continues to be clocked out at the low clock rate, as illustrated in FIG. 15e. At the time T3 of the end of line L1A switch 1424 is thrown to the next position so that the video at terminal 1422 during line L2 is available for writing into delay line 1433, delay line 1431 continues to be clocked out to terminal 1455 and the L1A data stored in delay line 1432 begins to be clocked out at the low rate. Switch 1415b is thrown to connect terminal 1453 with terminal 1456. The system continues to cycle, clocking into each delay line in succession at the high clock rate, followed by an interval of clocking out at the low clock rate as illustrated in FIGS. 15b-e. It should be noted that after the unloading period, each CCD goes through one H/2 interval in a quiescent state. As illustrated in FIGS. 15d and e, the L2 information loaded by delay 1433 in the interval T4-T5 is unloaded in the interval T5-T9, while the L2A information loaded into delay 1434 in the interval T6-T7 is read out in the interval T7-T11. Thus, it can be seen that the information of the paired lines appears at terminals 1455, 1456, relatively delayed by H/2. This is corrected by an H/2 delay line 1460 coupled in the L1, L2, L3 . . . path, with the result that the information from the line pairs occurs simultaneously at output terminals 1462, 1464 as illustrated in FIGS. 15f-i.

Figure 16:
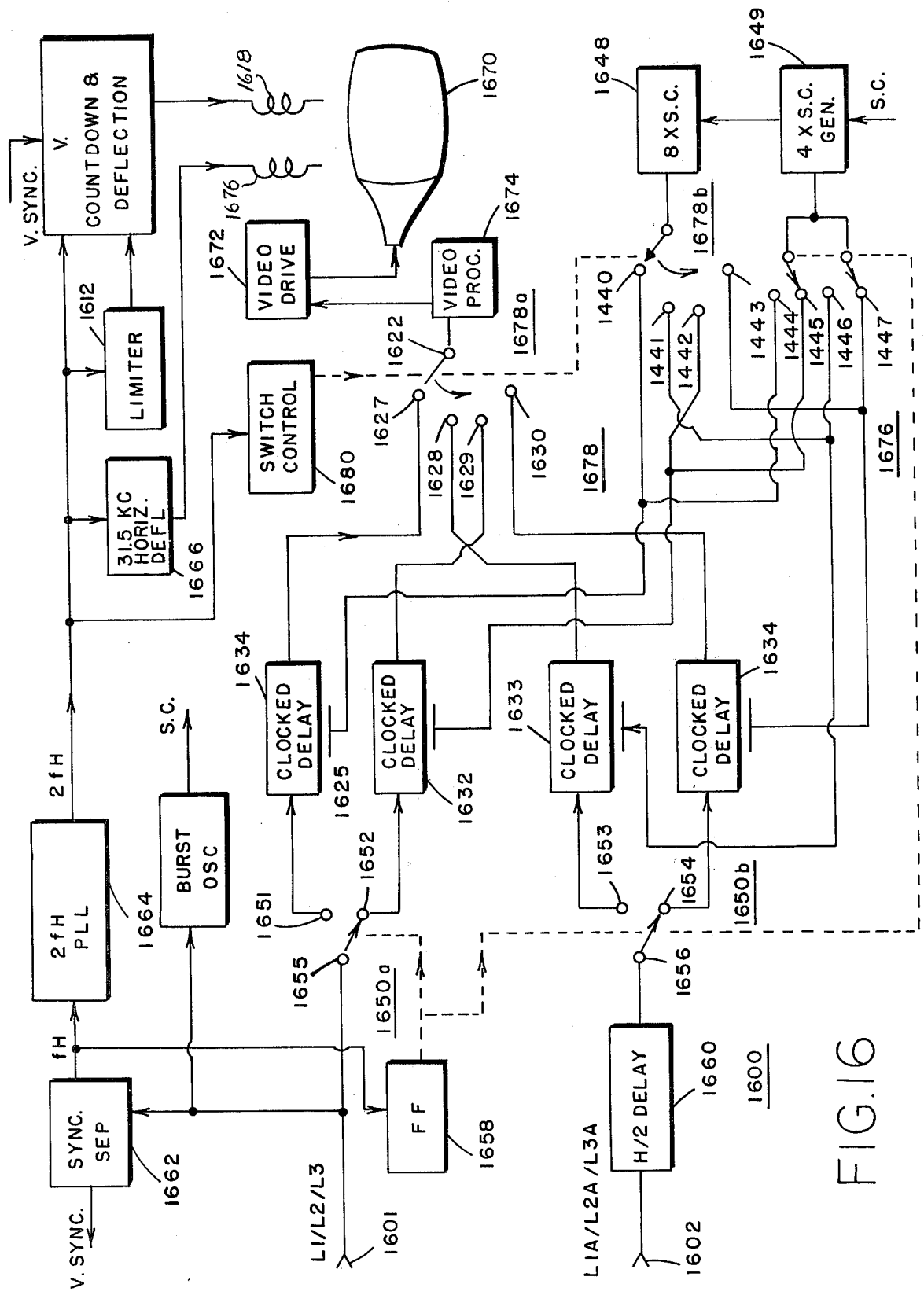
FIG. 16 is another embodiment of a television monitor according to the invention in which 2FH scanning is used.

A high-resolution monitor of FIG. 16 is arranged to scan at twice the standard horizontal frequency; at 31.5 KHz in the case of NTSC. In the arrangement of FIG. 16, the input signal is in the form of two video signals occurring simultaneously, each of which represents the video from two adjacent scanned lines. The video signals are applied to terminals 1601 and 1602 at the left of the FIGURE. The arrangement of FIG. 16, generally speaking, is the reverse of the arrangement of FIG. 14. In FIG. 16, the two incoming simultaneous signals at 15,750 Hz are rearranged as sequential 31.5 Khz signals which are applied to kinescope 1670 at the right of the FIGURE. A sync separator 1662 coupled to input terminal 1601 separates vertical and horizontal sync which is applied to a 2 FH PLL 1664 for producing 2 FH drive signals. (Alternatively, sync could be separately introduced and applied directly where required.) The 2 FH signal is applied to a vertical countdown and deflection circuit 1668 which generates a stepped ramp as described in conjunction with FIG. 14 which is applied to a vertical deflection winding 1618 associated with kinescope 1670. The 2 FH signal is also applied as drive to a horizontal deflection circuit 1666 which drives a horizontal deflection winding 1676 at 31.5 KHz. At 31.5 KHz, each scan across the face of kinescope 1670 occurs in FH/2. Consequently, the two parallel input signals must be time-compressed and arranged in sequential order.

Switches 1650a and 1650b are operated by signal produced by flip flop (FF) 1658a. FF 1658 is driven by FH signal.

As incoming signals representing lines L1 and L1A are received, switches 1650a and 1650b are in the down position connecting terminals 1655 and 1656 to delay lines 1632 and 1634, respectively. Clock signals for these delay lines are provided from the 4X subcarrier generator 1649. These lines are written into the delays, and writing is completed during one fH interval or cycle. At the completion of the input of lines L1 and L1A switches 1650a and 1650b are switched to their upper positions by a signal from FF 1658 and the next incoming line pair (L2 and L2A) begins to load into delay lines 1631 and 1633. Switch 1676 is also operated by FF 1658 and applies 4XSC (low) clock signal to delays 1631 and 1633 by way of contacts 1444 and 1445, respectively. During the time period in which lines L2 and L2A are being received and written into delays 1631, 1633, readout of line L1 begins from delay line 1632 while delay line 1634 is quiescent. Switch terminal 1622 is connected to terminal 1628 by a trigger signal from 31 KHz clock, connecting the video processing unit 1674 to the output of delay line. At the same time an 8X subcarrier clock 1648 is connected to delay line 1633 from the 8X generator through terminal 1441 which is switched at the 31 KHz rate in synchronism with the video output switch. Readout of delay line 1632 is completed in half of the normal 15 KHz period, and switch 1678 is operated to a new position at which switch terminal 1622 and the output of 8X subcarrier generator 1648 are coupled to delay line 1634 which is read out, thus developing the required video for the display. The sequence of parallel read-in, sequential read-out continues for supplying signal for the 31.5 KHz scan of the monitor.

Figure 17:
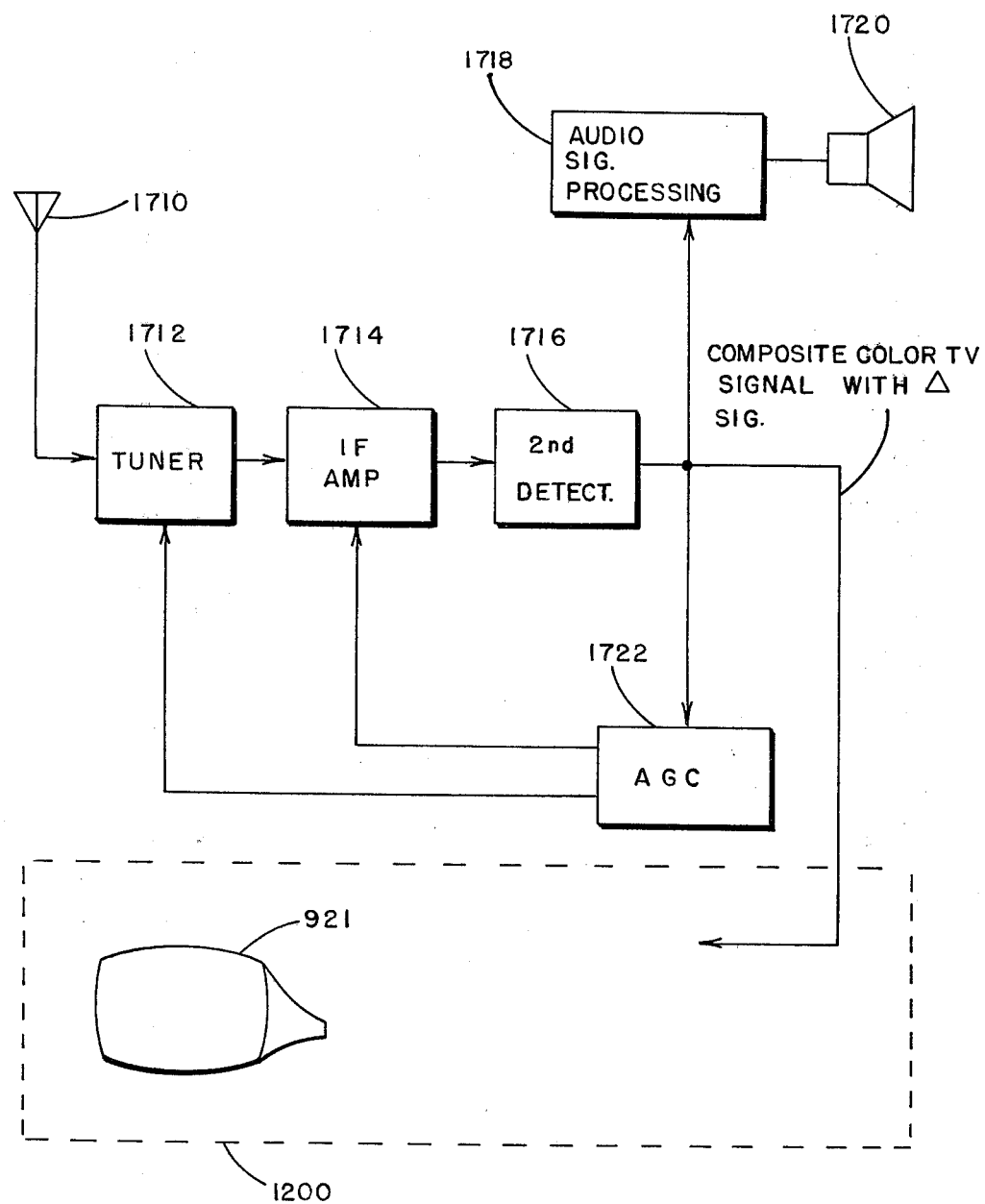
FIG. 17 is a television broadcast receiver adapted for use with broadcasts including signals according to the invention.

FIG. 17 illustrates a broadcast television receiver according to the invention. In FIG. 17 an antenna 1710 receives composite color television signals with buried Δ signal, the whole modulated onto carriers at standard broadcast frequencies with vestigial lower sidebands and with FM-modulated audio signals offset from the video carrier frequency in the usual manner. A tuner 1712 selects one of the carriers and converts it to a standard IF frequency. The resulting IF signal is amplified by an IF amplifier 1714 and is applied to a second detector 1716 for conversion to baseband. The audio signal is applied to an audio signal processing circuit 1718 which may include an FM demodulator for producing baseband audio and which may also include an audio drive for driving a loudspeaker 1720 associated with the receiver. The baseband video signal is applied to an AGC control circuit 1722 which is coupled to the IF amplifier and tuner for controlling the baseband video amplitude. The controlled-amplitude baseband composite color television signal with Δ is applied to circuitry corresponding to monitor 1200 of FIG. 12 for producing on a color kinescope 921 a color television signal with increased vertical resolution.

Figure 18:
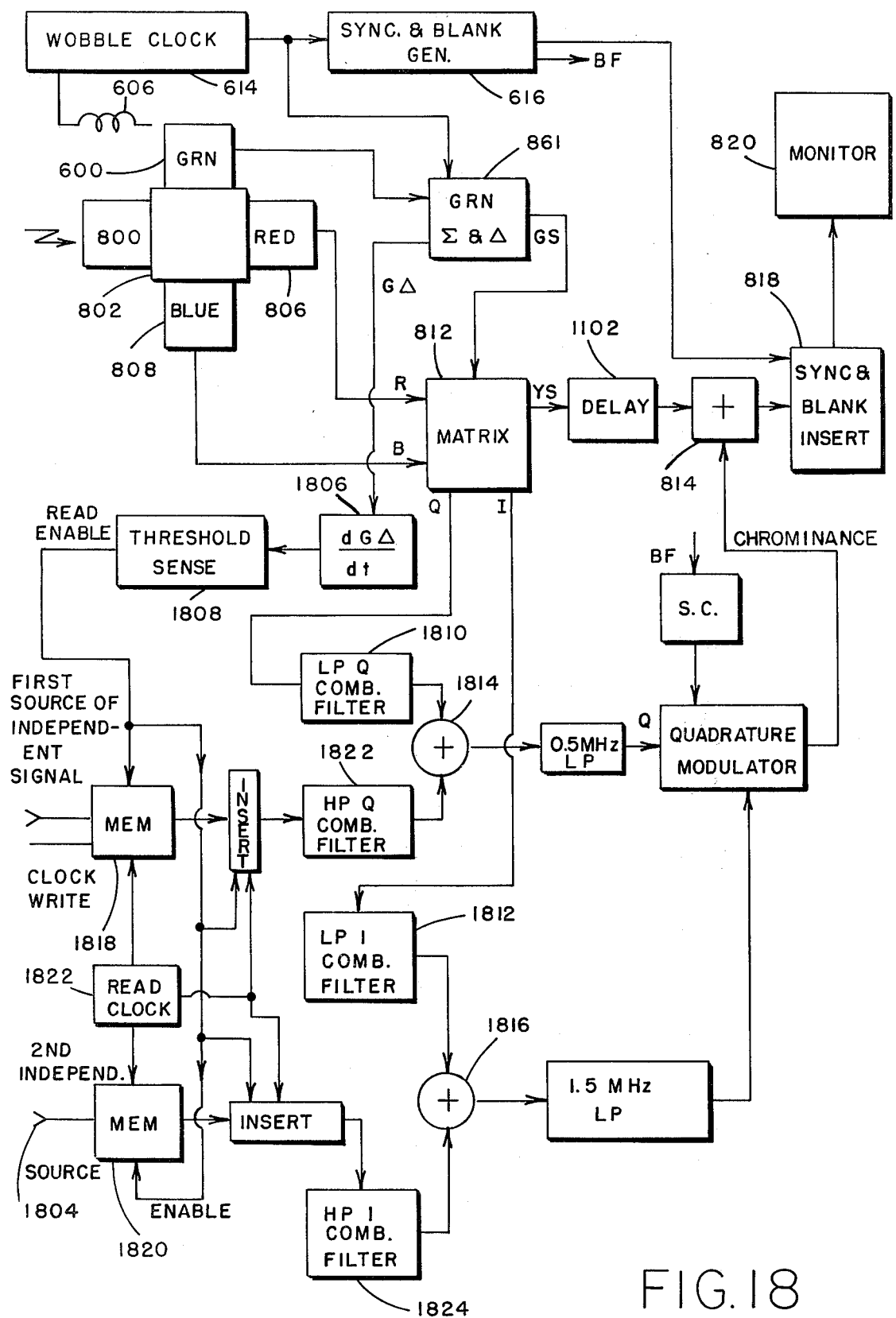
FIG. 18 is an embodiment of the invention in which independent signals are multiplexed through fourth and fifth signal channels within a composite color TV signal processing path.

FIG. 18 illustrates an arrangement for burying independent signals from first and second sources coupled to terminals 1802 and 1804 (to the left of the FIGURE) within the Q and I signals, respectively, of a composite color television signal. In FIG. 18, light from a source (not shown) is applied through optics 800 to a splitting prism 802 which divides the light and applies it to red and blue vidicons 806 and 808 and to a green vidicon 600 the deflection of which is wobbled at a wobble clock rate by an auxiliary deflection winding 606 driven from clock generator 614. Generator 614 also drives sync and blanking generator 616 to generate burst flag and the sync and blanking signals which are coupled to an inserter 818. The red and blue video signals are applied from vidicons 806 and 808 to a matrix 812. The green-representative signal is applied to a summing and differencing circuit 861 such as that illustrated in FIG. 8 consisting of a combination of synchronous modulator 618 and sum and difference circuit 700 of FIG. 7. Circuit 861 generates a GS signal which is applied to an input of matrix 812 and G signal of a differentiator illustrated as a block 1806 the output of which is coupled to a threshold sense circuit 1808 which produces a read enable signal when the rate of change of the GΔ signal exceeds a predetermined level. The Y signal for matrix 812 is applied through a delay 1802 to a summing circuit 814. The Q and I signals produced by matrix 812 are applied to low-pass comb filters 1810 and 1812, respectively, for combing out of the Q and I signals those portions representing rapid rate of change. The combed Q and I signals are applied to summing circuits 1814 and 1816, respectively. The independent signals from the first and second sources are applied together with their clock signals to memories 1818 and 1820, respectively, which act as buffers for accumulating the independent signals during those periods of time when the rate of change of the video signal is not great enough to conceal the independent signal. When a vertical-rate transition occurs, threshold sense 1808 produces a read enable signal which is coupled to memories 1818 and 1820 to enable reading at the rate of clock 1822, which is selected to interleave the independent signal into the I and Q signals. The independent signals being read from memories 1818 and 1820 are cleaned up in high-pass comb filters 1822 and 1824, respectively, and applied to summing circuits 1814 and 1816 to be combined with their respective concealing signal. The resulting signals are low-pass filtered and applied to quadrature-modulators in known fashion for producing a chrominance signal which is summed with the YS signal in adder 814 and otherwise processed in the manner of a standard signal. A standard NTSC color television receiver may display the independent signal on the edges of vertical luminance transitions in the form of color errors in the transition region, but such errors especially for large luminance transitions are subjectively not very visible. Consequently, a standard receiver is essentially insensitive to the buried information.

Figure 19:
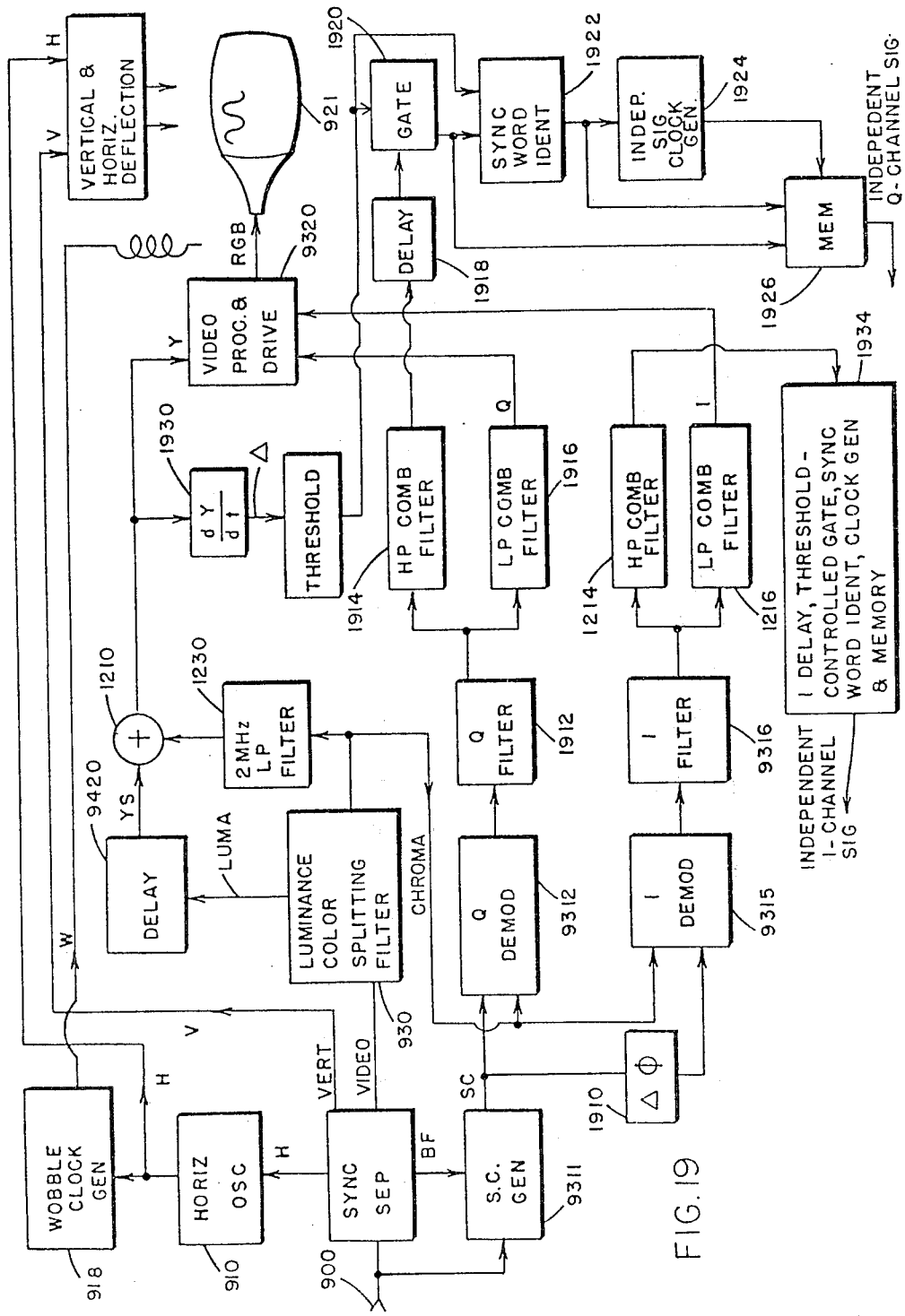
FIG. 19 is a receiver for signals generated in the arrangement of FIG. 18.

FIG. 19 illustrates a receiver adapted for displaying conventional television signals in which independent signals are buried and for extracting the independent signals. Those elements of FIG. 19 corresponding to elements of FIG. 12 are designated by the same reference numeral. FIG. 19 differs from the arrangement of FIG. 12 in that the demodulated and filtered I and Q signals are both passed through complementary high-pass and low-pass filters and in that the luminance signal is differentiated and thresholded to control additional independent-signal processing.

In FIG. 19, the Q signal is applied to a complementary high-pass-low-pass comb filter pair 1914-1916 similar to filter pair 1214-1216 of FIG. 12. The Q signal is available at the output of filter 1916 and is applied to the Q input of video process and drive circuit 9320. The independent signal appears at the output of high-pass filter 1914. 1920 is coupled to the sum luminance and compares adjacent lines to produce a Δ signal which is applied to a threshold circuit illustrated as a block 1932 for generating a signal indicative of the time when independent signal may be coupled through the system. The independent signal which appears at the output of filter 1914 is appllied to a delay circuit 1918 having a delay sufficient to delay the independent signal until after the operation of threshold 1932 couples the independent signal to a gate 1920 which is operated by the enable signal. The gate couples the independent signal to a sync word identifying circuit 1922 and to the input of a memory circuit 1926. Sync word identifier 1922 identifies a sync signal near the expected time of receipt thus enabling independent signal clock generator 1924 to regenerate the clock signal to enable the signal to be written into memory 1926, where it remains available for use. In a similar fashion, the independent I-channel signal becomes available at the output of high-pass comb filter 1214 and is coupled to a delay, gate, sync word identifier, clock generator and memory 1934 for the I channel corresponding to elements 1918-1926 of the Q channel.

Other embodiments of the invention will be apparent to those skilled in the art. Rather than inserting the Δ information into the I channel, it can be inserted into the Q channel in the same manner as that described so long as the reduced Q bandwidth is acceptable for the bandwidth of the signal. A plurality of Δ signals can be inserted into both the I and Q channels, which for this purpose constitute fourth and fifth channels within the composite video transmission path. Similarly, a Δ signal can be inserted in either I or Q and an independent signal can be inserted into the other channel. Other wobble clock frequencies can be used in those embodiments using wobble clocks, and as mentioned these clocks may be locked to various system signals.

The invention can be used in conjunction with PAL composite color TV transmission systems in the same fashion as with NTSC, since the monochromatic or luminance aspects of the resolution are the same and the principles of the color transmission differ from NTSC only in minor details not relevant to the concealment aspects of the invention.

While the S and Δ signals in the embodiments illustrated were derived from a green channel of a tricolor signal source, the difference signal could if desired be derived from the R or B signals, or the RGB signals from the source could be matrixed to produce pairs of simultaneous Y signals which could then be summed and differenced to produce YS and Y Δ signals.

Another embodiment of the color camera of FIG. 3 could use red, blue and luminance-responsive tubes as known, with two tubes in the luminance channel and one tube each in the chroma channels for reduced cost. The offset of the rasters of the two vidicons (or the corresponding offset of the images) in the arrangement of FIG. 4 can be in multiples of ½ of the interline distance plus ¼ line, rather than simply ¼ line.

What is claimed is:

1. A television receiver of the type for simultaneously receiving standard color television signals having standard amounts of detail intermixed with special television signals representative of additional detail including additional detail in the vertical direction, the additional detail being in the form of a signal representing the difference between scan lines, the special television signals being intermixed with the standard color television signals by being buried in portions of the color parts of the standard color television signals, the portions of the color parts of the standard color television signals in which the special signals are buried ordinarily being used for fine color details of the picture which are not very perceptible, the receiver comprising:
- a first signal separator coupled to the source of signals for separating the color parts of the incoming signal from those parts representing standard black-and-white information;
- a second signal separator coupled to said first signal separator for separating the buried special television signals from the color parts of the signal; and
- a display arrangement coupled to the first and second signal separators for making pictures having a lot of detail from the special television signals and those parts representing standard black-and-white.

2. A receiver for high-resolution compatible color television signals, comprising: receiving means for receiving the high-resolution compatible color television signals; first separation means coupled to said receiving means for separating luminance and mixed luminance-chrominance-representative portions of said signal; second separation means coupled to said first separating means for separating from said mixed portion of said signal a second luminance-representative signal; and display means coupled to said first and second separation means for producing a high-resolution display in response to said first and second luminance-representative signals, wherein said second luminance-representative signal represents the difference between first and second lines of video and said first luminance-representative signal represents the sum of said first and second lines.

3. A receiver according to claim 2 wherein said display means sums said first and second luminance-representative signals.

4. A receiver according to claim 2 wherein said display means vectorially sums said first and second luminance-representative signals in such a manner as to form a difference signal.

5. A receiver according to claim 2 wherein said first and second lines are adjacent.

6. A high-resolution television communication system comprising: scanning means for generating luminance-representative signals from line scans; difference means coupled to said scanning means for generating a difference signal representative of the difference between first and second scanned lines; display means responsive to said luminance-representative signals and to said difference signals for generating first and second lines of raster scan, at least one of said first and second lines of raster scan being generated from a sum of said luminance-representative video signal and said difference signal.

7. A system according to claim 6 wherein said sum produces a signal representative of the sum of the signals of said first and second scanned lines.

8. A system according to claim 6 wherein said sum produces a signal representative of the difference of said first and second scanned lines.

9. A system according to claim 6, 7, or 8, wherein said scanning means comprises summing means for summing together the signals of said first and second scanned lines whereby said luminance-represenative signal represents the sum of the signals of said first and second scanned lines.

10. A system according to claim 6, 7 or 8 wherein said first and second scanned lines are adjacent lines.

11. A system according to claim 10 wherein said first and second lines are scanned simultaneously.

12. A color television transmission apparatus comprising:
- a luminance-representative signal processing channel for processing luminance signals representative of repetitive independent pairs of line-scans of an image;
- first and second chrominance-signal processing channels for processing first and second line-scan chrominance-signals, respectively; and
- a difference-signal processing channel for processing second luminance signals representative of the amplitude difference between the video from said adjacent line-scan pairs.

13. A method of producing a high-definition television display representative of a scene, comprising the steps of line-scanning an image of the scene to produce signals representative of said image; generating a signal representative of the sum of signals from adjacent line scans; generating a signal representative of the difference between signals from adjacent line scans; reconstituting from said sum-and-difference-representative signals corresponding to said signals representative of the scene; and displaying said reconstituted signals in a line-scan manner.

14. A method according to claim 13 wherein said step of line-scanning an image of the scene produces said signals representative of said image in groups of lines, and said groups contain only lines not contained in other groups.

15. A method according to claim 14 wherein said groups of line-scans contain pairs of lines.

16. A method of producing a high-definition television display representative of a scene, comprising the steps of
- line-scanning an image of the scene to produce signals representative of said image;
- generating a signal representative of the sum of signals from independent line scan groups;
- generating a signal representative of the difference between signals from adjacent line scans;
- reconstituting from said sum-and-difference-representative signals corresponding to said signals representative of the scene; and
- displaying said reconstituted signals in a line-scan manner.

17. A transmission system in which signals independent of video are transmitted in buried fashion in a composite color television signal, said transmission system comprising;
- a source of television baseband luminance signal;
- a source of television baseband chroma signal; filter means coupled to said source of television baseband chroma signal for clearing a portion of the frequency spectrum of said baseband chroma signal;
- first adder means coupled to the source of independent signals and to said filter means signal for summing said chroma and independent signals together with said independent signal frequency interleaved with said chroma signal; and
- second adder means coupled to said first adder means and to said source of luminance signal for summing said luminance signal with said frequency-interleaved chroma and independent signals.

18. A system according to claim 17 wherein said system further comprises:

control means coupled to said source of luminance signal for generating a signal representative of the rate of change of said luminance signal;

enabling means coupled to said first adder means for enabling said first adder means in response to said signal representative of the rate of change of said signal; and coupling means for coupling said control means with said enabling means.

19. A system according to claim 18 wherein said coupling means comprises threshold means coupled to receive said signal representative of the rate of change of said luminance signal for generating a control signal when said rate of change exceeds a controlled level, and wherein said enabling means responds to said control signal for enabling said first adder means.

20. A system according to claim 17 wherein said baseband chroma signal is a color-difference signal.

21. A system according to claim 20 wherein said color-difference signal is an I signal.

22. A system according to claim 20 wherein said color-difference signal is a Q signal.

23. A system according to claim 17 wherein said filter means comprises comb filter means.

24. A system according to claim 23 wherein said comb filter means further compries:

a delay line; and a summing circuit having a first input coupled to the output of said delay line and also having a second input, said second input being coupled to the input of said delay line whereby said comb filter has a low-pass characteristic.

25. A system according to claim 23 wherein said comb filter means further comprises:

a delay line; and a subtracting circuit having a first input coupled to the output of said delay line and also having a second input, said second input being coupled to the input of said delay line whereby said comb filter has a high-pass characteristic.

26. A system according to claim 17 further comprising modulator means coupled to said first adder means for modulating said added independent and chroma signals.

27. A method for transmitting independent signals buried in composite color television signals, comprising the steps of:

generating baseband video luminance signals;

generating baseband chroma signals;

filtering said baseband chroma signals for clearing a portion of the frequency spectrum;

adding the independent signal to said chroma signal in a frequency-interleaved fashion; and adding said frequency-interleaved independent and chroma signals with said luminance signal.

28. A method according to claim 27 further comprising the step of modulating said frequency-interleaved independent and chroma signals onto a carrier.

29. An arrangement for transmitting high vertical-definition television signals comprising:

a source of high-vertical-definition line-scan signals representative of an imaging averaging means coupled to said source of high-definition signals for limiting the definition of said high-definition line-scan signals by generating signals representative of the sum of independent groups of said line-scan signals to form limited-definition television signals;

subtracting means coupled to said source of high-definition television signals for comparing spatially adjacent lines of said independent groups of said high-definition signals to form a difference signal representative of the difference therebetween; and summing means coupled to said averaging means and to said substracting means for summing said limited-definition and difference signals to reconstitute said high-definition television signal.

30. An arrangement according to claim 29 wherein said spatially adjacent signals are separated vertically by one line spacing.

31. An arrangement according to claim 30 wherein said source of high-definition television signals, said averaging and subtracting means are located at a transmitter of compatible high-definition signals, and said summing means is located at a receiver of compatible high-definition television signals.

* * * * *